US010412053B2

(12) United States Patent
Dong et al.

(10) Patent No.: US 10,412,053 B2
(45) Date of Patent: *Sep. 10, 2019

(54) SERVICE LAYER DEVICE LOCATION MANAGEMENT AND PRIVACY CONTROL

(71) Applicant: Convida Wireless, LLC, Wilmington, DE (US)

(72) Inventors: Lijun Dong, San Diego, CA (US); Guang Lu, Thornhill (CA); Dale N. Seed, Allentown, PA (US); Chonggang Wang, Princeton, NH (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/274,643

(22) Filed: Feb. 13, 2019

(65) Prior Publication Data

US 2019/0182215 A1 Jun. 13, 2019

Related U.S. Application Data

(63) Continuation of application No. 14/340,623, filed on Jul. 25, 2014.

(Continued)

(51) Int. Cl.
*H04L 29/06* (2006.01)
*H04W 4/70* (2018.01)
(Continued)

(52) U.S. Cl.
CPC ............ *H04L 63/04* (2013.01); *H04L 63/107* (2013.01); *H04L 63/20* (2013.01); *H04L 67/18* (2013.01);
(Continued)

(58) Field of Classification Search
CPC ....... H04L 63/04; H04L 63/107; H04L 63/20; H04L 67/18; H04W 4/70; H04W 12/02; H04W 4/21; H04W 12/00; H04W 4/023
See application file for complete search history.

(56) References Cited

U.S. PATENT DOCUMENTS 5,995,500 A   11/1999  Ma et al.
7,154,409 B2  12/2006  Mohammed et al.
(Continued)

FOREIGN PATENT DOCUMENTS

EP    1691565 A1      8/2006
JP    2005-070920 A   3/2005
(Continued)

OTHER PUBLICATIONS

Zisman et al, "Proactive Runtime Service Discovery", Services Computing, 2008, IEEE International Conference Piscataway, NJ, Jul. 7, 2008, pp. 237-245.

(Continued)

*Primary Examiner* — Joseph E Dean, Jr.
(74) *Attorney, Agent, or Firm* — BakerHostetler

(57) ABSTRACT

A machine to machine (M2M) service layer can facilitate acquiring and providing location information for use by M2M devices. The service layer can also ensure that privacy controls are maintained and enforced for location information. A device can report its location and its privacy preferences to a service layer device. Other devices can receive this location information subject to qualifying to receive it based on the privacy preferences. Devices in an area may advertise services with the service layer acting as a filter and relay point ensuring that such advertisements satisfy the privacy policies of the devices involved.

20 Claims, 27 Drawing Sheets

Related U.S. Application Data

(60) Provisional application No. 61/858,220, filed on Jul. 25, 2013.

(51) Int. Cl.
| | | |
|---|---|---|
| *H04W 12/02* | (2009.01) | |
| *H04L 29/08* | (2006.01) | |
| *H04W 4/02* | (2018.01) | |
| *H04W 12/00* | (2009.01) | |
| *H04W 4/21* | (2018.01) | |

(52) U.S. Cl.
CPC ............ *H04W 4/70* (2018.02); *H04W 12/02* (2013.01); *H04W 4/023* (2013.01); *H04W 4/21* (2018.02); *H04W 12/00* (2013.01)

(56) References Cited

U.S. PATENT DOCUMENTS

| | | | |
|---|---|---|---|
| 8,542,671 | B2 | 9/2013 | Maes |
| 9,717,027 | B2 * | 7/2017 | Ahn ................. H04L 12/66 |
| 2005/0059412 | A1 | 3/2005 | Hosokawa |
| 2005/0270157 | A1 | 12/2005 | Mohammed et al. |
| 2006/0123116 | A1 | 6/2006 | Rahman et al. |
| 2006/0235872 | A1 | 10/2006 | Kline et al. |
| 2009/0131021 | A1 | 5/2009 | Vogedes et al. |
| 2009/0319366 | A1 | 12/2009 | Choi et al. |
| 2013/0066965 | A1 | 3/2013 | Foti |
| 2013/0231138 | A1 | 9/2013 | Hans et al. |
| 2014/0188614 | A1 | 7/2014 | Badenhop |

FOREIGN PATENT DOCUMENTS

| | | |
|---|---|---|
| JP | 2011-103148 A | 5/2011 |
| WO | 2015/013559 A1 | 1/2015 |

OTHER PUBLICATIONS

Japanese Patent Application No. 2016-530057: Notice of Reasons for Rejection dated Apr. 18, 2017, 6 pages.

International Patent Application No. PCT/US2014/048101: International Search Report and Written Opinion dated Oct. 21, 2014, 14 pages.

European Application No. 14 750 880.8: European Office Action dated Nov. 7, 2016, 5 pages.

Amudha et al, "A Multi-Agent Based Framework for Dynamic Service Discovery and Access Using Matchmaking Approach", Intelligent Agent & Multi-Agent Systems, 2009, International Conference on IEEE, Piscataway, NJ, Jul. 22, 2009, pp. 1-4.

3rd Generation Partnership Project; (3GPP), TS 21682 V11.4.0, 3rd Generation Partnership Project; Technical Specification Group Services and System Aspects; Architecture Enhancements to Facilitate Communications With Packet Data Networks and Applications (Release 11), Jun. 2013.

3rd Generation Partnership Project; (3GPP), TS 21271 V11.2.0, 3rd Generation Partnership Project; Technical Specification Group Services and System Aspects; Functional stage 2 description of Location Services (LCS) (Release 11), Mar. 2013.

* cited by examiner

SERVICE LAYER DEVICE LOCATION MANAGEMENT AND PRIVACY CONTROL

CROSS-REFERENCE TO RELATED APPLICATIONS

This application is a continuation of U.S. patent application Ser. No. 14/340,623, entitled "Service layer device location management and privacy control," filed Jul. 25, 2014, and claims the benefit of U.S. Provisional Application No. 61/858,220, filed on Jul. 25, 2013, entitled "Service layer device location management and privacy control", the content of which are hereby incorporated by reference in their entirety.

BACKGROUND

Machine-to-machine (M2M) technologies allow devices to communicate more directly with each other using wired and wireless communications systems. M2M technologies enable further realization of the Internet of Things (IoT) or Web of Things (WoT), a system of uniquely identifiable objects and virtual representations of such objects that communicate over a network, such as the Internet. IoT/WoT may facilitate communication with even mundane everyday objects, such as products in a grocery store, and thereby reduce costs and waste by improving knowledge of such objects. For example, stores may maintain very precise inventory data by being able to communicate with, or obtain data from, objects that may be in inventory or may have been sold.

Today's more powerful user devices are able to host and provide services via M2M technologies that in the past were hosted and provided by service providers using proprietary systems. However, for end user devices to successfully offer services for other devices, M2M technologies will need improved location management and privacy control.

SUMMARY

Disclosed herein are methods, devices, and systems for location information management and privacy control at an M2M service layer. A device may report its location to a service layer and send a privacy policy for its location information to the service layer. Privacy policies may be based on a distance or range from the device, relationships with the device, or other criteria. A service layer may inform a device of other devices whose locations are public and the device may designate the other devices that may receive its location information. A device may update its location at the service layer when it moves from one place to another. Previous location information may be invalidated by the service layer.

A device may change its privacy policy. If some of the devices that were previously informed of the device's location information no longer satisfy the new privacy policy, the service layer may send invalid location information to those devices. A device's location information may also be deleted from the service layer. Devices that were previously informed of the device's deleted location information may receive notification of the deletion from the service layer. A device's location may be retrieved from the service layer by other devices and applications if they satisfy the privacy policy established for the device. A device may identify whether it can communicate with another device directly based on each device's location.

Using the embodiments set forth herein, a service layer may act as a relay point for device services requests and advertisements. A device may advertise its services to other entities in the proximity by retrieving location information for such devices from the service layer. Alternatively, a device may grant a service layer permission to push other devices' location information to it if the device satisfies the privacy policy for each of the other devices' privacy policies. When a device wants to request a service a service layer may locate the proximate devices that provide the service and whose location information is available to the requesting device. The service layer may also forward such requests to the serving devices. A service layer may predefine a service directory based on the location of service providing devices.

Other applications and uses of the presently disclosed embodiments are described. A device may propagate information or data that was received from a service layer, such as important updates for an event or a disaster, to other devices in cases where the other devices no longer have access to a service layer because infrastructure is damaged or unavailable. A device's location may be pushed to other devices to facilitate social networking. The various embodiments described herein also include oneM2M and 3GPP embodiments and their functionalities and capabilities.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

DETAILED DESCRIPTION OF ILLUSTRATIVE EMBODIMENTS

Figure 1:
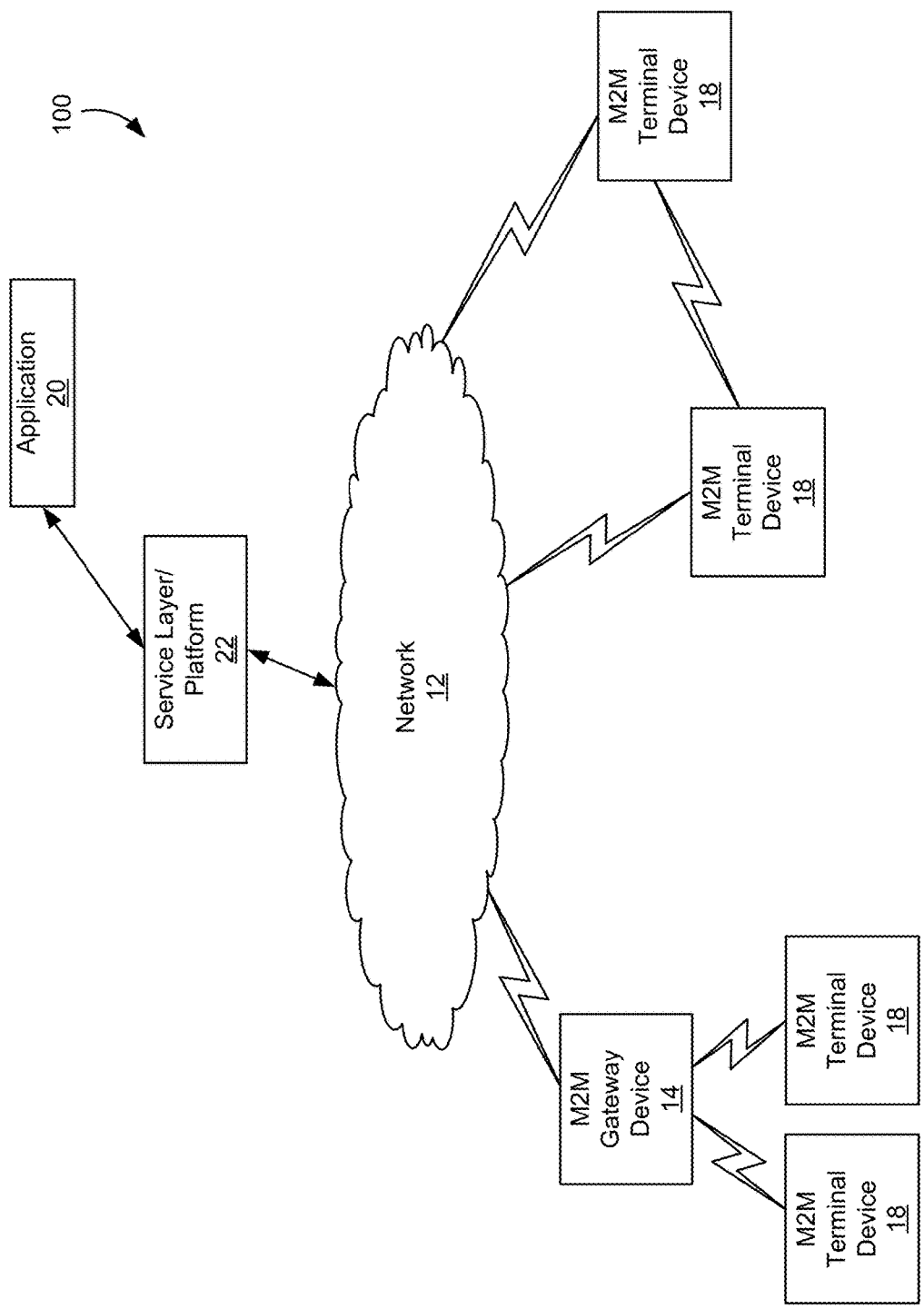
FIG. 1 is a system diagram of an example machine-to-machine (M2M), Internet of Things (IoT), or Web of Things (WoT) communication system in which one or more disclosed embodiments may be implemented.

A Location-Based Service (LBS) is a service that integrates a mobile device's location or position with other information to provide added value to a user. The Global System for Mobile Communications (GSM) association has defined an LBS as a service that uses the location of a target for adding value to the service, where the target is the entity to be located (but not necessarily the user of the service). The 3rd Generation Partnership Project (3GPP) defines an LBS as a service provided by a service provider that utilizes available information regarding the terminal. An example of LBS is the Global Positioning System (GPS). GPS has been in use by the United States Department of Defense since the 1970s. In the 1980s, GPS became available freely worldwide.

Because M2M systems are envisioned as providing LBSs, location is important context information for an M2M device. M2M systems may report an M2M device or M2M gateway location to an M2M application when this information is available. Location information of an M2M device or M2M gateway may be determined either by underlying network procedures (which often take into account relevant privacy and security settings for the transfer of such information) by application level information reported from an M2M device or gateway application, or by using a combination of both methods. By utilizing the device location information, many applications may be improved and/or implemented in various industries, such as automotive (e.g., fleet management, asset tracking, stolen property tracking), city automation (e.g., public transportation vehicle tracking), eHealth (e.g., patient location tracking), and location based targeted advertising.

Location based applications in an M2M system may use traditional tracking functionality. With more powerful M2M devices, including portable user equipment (UE) devices such as cell phones and tablet computers, M2M devices may host and provide services to other devices in the proximity. For example, food recommendations may be provided by peer devices in a restaurant, or merchandise recommendations may be provided by peer devices in a store or mall. Today such functions are often provided by proprietary applications running on different device platforms. Current M2M systems lack the location management and privacy control functionalities that would enable emerging device-independent M2M services.

While location resources for an M2M functional architecture have been proposed by the European Telecommunications Standards Institute (ETSI), M2M systems currently lack mechanisms to manage device locations or provide a device with the authority and flexibility to control the privacy of the device's location information. The ETSI M2M accessRight functionality may not be sufficient for securing location information because a device has no prior knowledge that it can use to designate the devices in its proximity that may have access to its location information. Moreover, which other devices are in the proximity of a device may change over time. Although the location resource in the ETSI M2M architecture is a way to store location information, the ETSI M2M configuration does not support any service capabilities that are enabled by the stored location resources. Disclosed herein are methods, devices, and systems for improved location information management and privacy control in an M2M service layer.

Example M2M Communication System

FIG. 1 is a diagram of an example machine-to machine (M2M), Internet of Things (IoT), or Web of Things (WoT) communication system 100 in which one or more disclosed embodiments of device location management and privacy control systems and methods may be implemented. Generally, M2M technologies provide building blocks for the IoT/WoT, and any M2M device, gateway or service platform may be a component of the IoT/WoT as well as an IoT/WoT service layer, etc.

The M2M/IoT/WoT communication system 100 includes a communication network 12. The communication network 12 may be a fixed network (e.g., Ethernet, Fiber, ISDN, PLC, or the like), be a wireless network (e.g., WLAN, cellular, or the like), or combine heterogeneous sub-networks. For example, the communication network 12 may comprise one or more multiple-access networks that provide content such as voice, data, video, messaging, broadcast, or the like to multiple users. Communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

Figure 2:
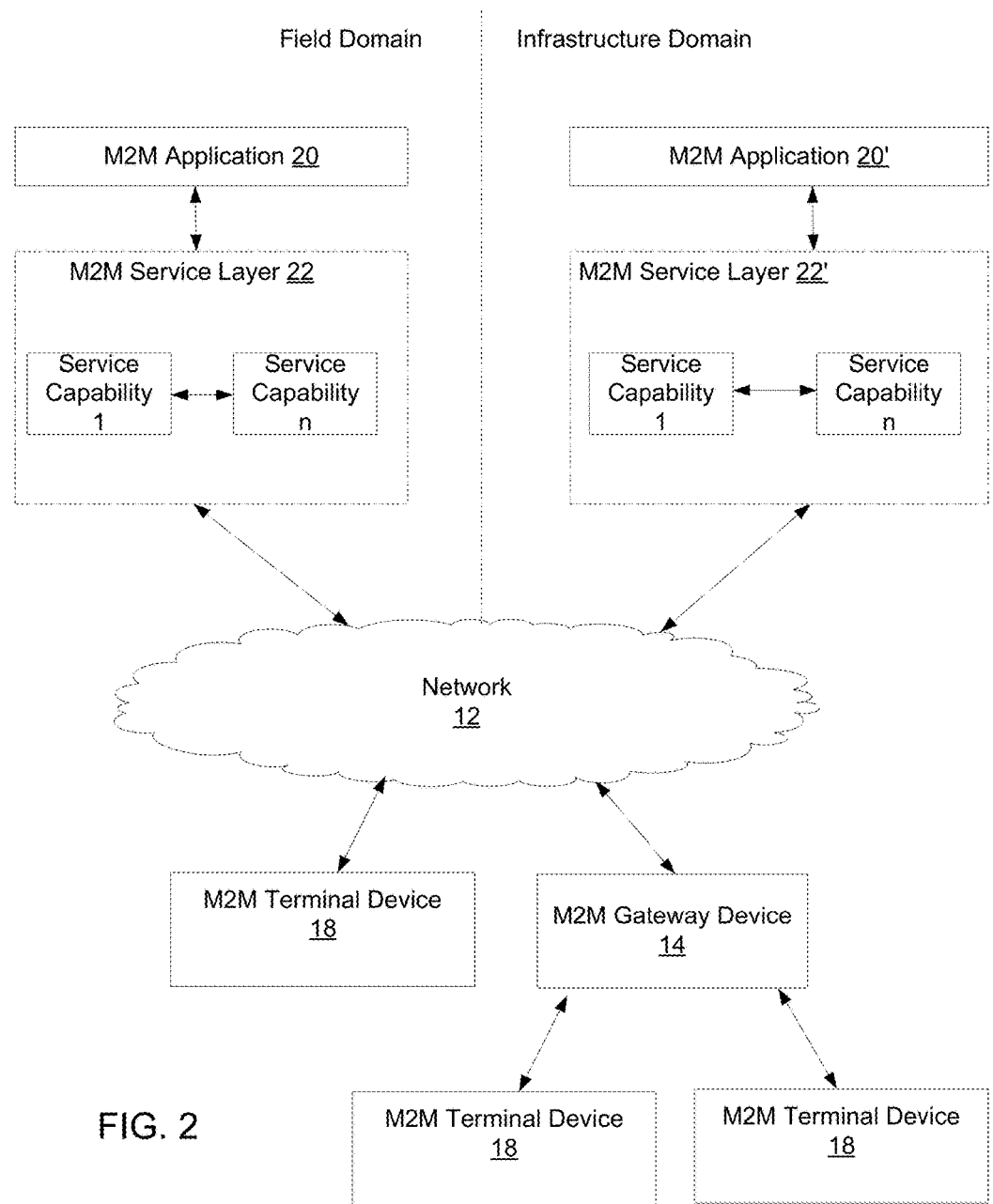
FIG. 2 is a system diagram of an example architecture that may be used within the M2M/IoT/WoT communications system illustrated in FIG. 1.

As shown in FIG. 2, the M2M/IoT/WoT communication system 100 (of FIG. 1) may include an Infrastructure Domain and a Field Domain. The Infrastructure Domain refers to the network side of the end-to-end M2M deployment, and the Field Domain refers to the area networks, usually behind an M2M gateway. For example, the Field Domain includes M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices (e.g. cellular and non-cellular) as well as fixed network M2M devices (e.g. PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example.

Referring again to FIG. 2, the illustrated M2M service layer 22 in the field domain provides services for the M2M application 20, M2M gateway devices 14, and M2M terminal devices 18 and the communication network 12. It will be understood that the M2M service layer 22 may communicate with any number of M2M applications 20, M2M gateway devices 14, M2M terminal devices 18 and communication networks 12 as desired. The M2M service layer 22 may be implemented by one or more servers, computers, devices, virtual machines (e.g. cloud/storage farms, etc.) or the like, including for example the device illustrated in FIG. 3 or the computer system illustrated in FIG. 4 and described below. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, or the like.

Similar to the illustrated M2M service layer 22, there is an M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. Like the M2M service layer 22, the M2M service layer 22' may be implemented by one or more servers, computers, devices, virtual machines (e.g. cloud/storage farms, etc.) or the like, including for example the device illustrated in FIG. 3 or the computer system illustrated in FIG. 4 and described below.

Still referring to FIG. 2, the M2M service layer 22 and 22' provide a core set of service capabilities that diverse applications and verticals can leverage. These service capabilities enable M2M applications 20 and 20' to interact with devices and perform functions such as data collection, data analysis, device management, security, billing, service/device discovery, and the like. Essentially, these service capabilities free the applications of the burden of implementing these functionalities, thus simplifying application development and reducing cost and time to market. The service layer 22 and 22' also enables M2M applications 20 and 20' to communicate through various networks (such as network 12) in connection with the services that the service layer 22 and 22' provide.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or as some other component or module of a network, the service layer may be implemented as a logical entity (e.g., software, computer-executable instructions, and the like) executing either on one or more stand-alone servers, computers, or other computing devices or nodes in the network or as part of one or more existing servers, computers, or nodes of such network. As an example, a service layer or component thereof may be implemented in the form of software running on a server, computer, or device having the general architecture illustrated in FIG. 3 or FIG. 4 described below.

In some embodiments, M2M applications 20 and 20' may include desired applications that can use location information, and therefore that may use the disclosed device location management and privacy control systems and methods disclosed herein. The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

Figure 3:
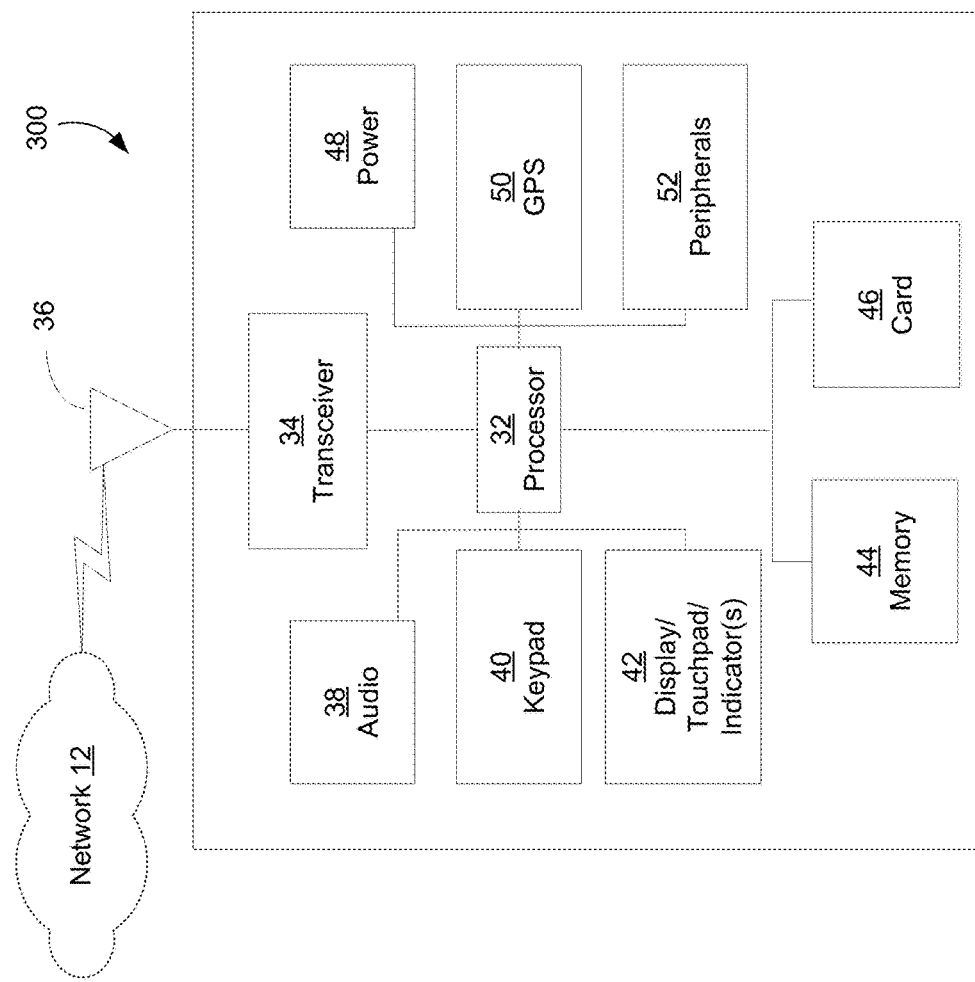
FIG. 3 is a system diagram of an example M2M/IoT/WoT terminal or gateway device that may be used within the communications system illustrated in FIG. 1.

FIG. 3 is a system diagram of an exemplary M2M device 300, such as an M2M terminal device 18, an M2M gateway device 14, or yet an M2M service platform 22, for example. As shown in FIG. 3, the M2M device 300 would normally include a computer processor 32, a transceiver 34, a transmit/receive element 36, non-removable memory 44, a power source 48. Device 300 may also include a user interface using such features as a speaker and/or microphone 38, a keypad 40, a display 42 which may be a touchpad and/or may include one or more indicators. Device 300 may also include a removable memory such as a memory card 46, a global positioning system (GPS) chipset 50, and/or other peripherals 52. It will be appreciated that the M2M device 300 may include any sub-combination of the foregoing elements while remaining consistent with an embodiment. M2M device 300 may use the disclosed device location management and privacy control systems and methods.

The processor 32 may be a general purpose processor, a special purpose processor, a conventional processor, a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGAs) circuits, any other type and number of integrated circuits (ICs), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

While FIG. 3 depicts the processor 32 and the transceiver 34 as separate components, it will be appreciated that the processor 32 and the transceiver 34 may be integrated together in an electronic package or chip. Similarly, other components, such as the non-removable memory 44, and GPS chipset, for example, may be packaged or integrated with the processor 32 or with each other.

The transmit/receive element 36 may be configured to transmit signals to, and/or receive signals from, an M2M service platform 22. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 3 as a single element, the M2M device 300 may include any number of transmit/receive elements 36. More specifically, the M2M device 300 may employ multiple-input-multiple-output (MIMO) antenna and spatial coding technology. Thus, in an embodiment, the M2M device 300 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple radio access technologies (RATs), such as UMTS Terrestrial Radio Access (UTRA) and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M device 30, such as on a server or a home computer.

The processor 30 may receive power from the power source 48, and may be configured to distribute and/or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which may be configured to provide location information (e.g., longitude and latitude) regarding the current location of the M2M device 30. It will be appreciated that the M2M device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 4:
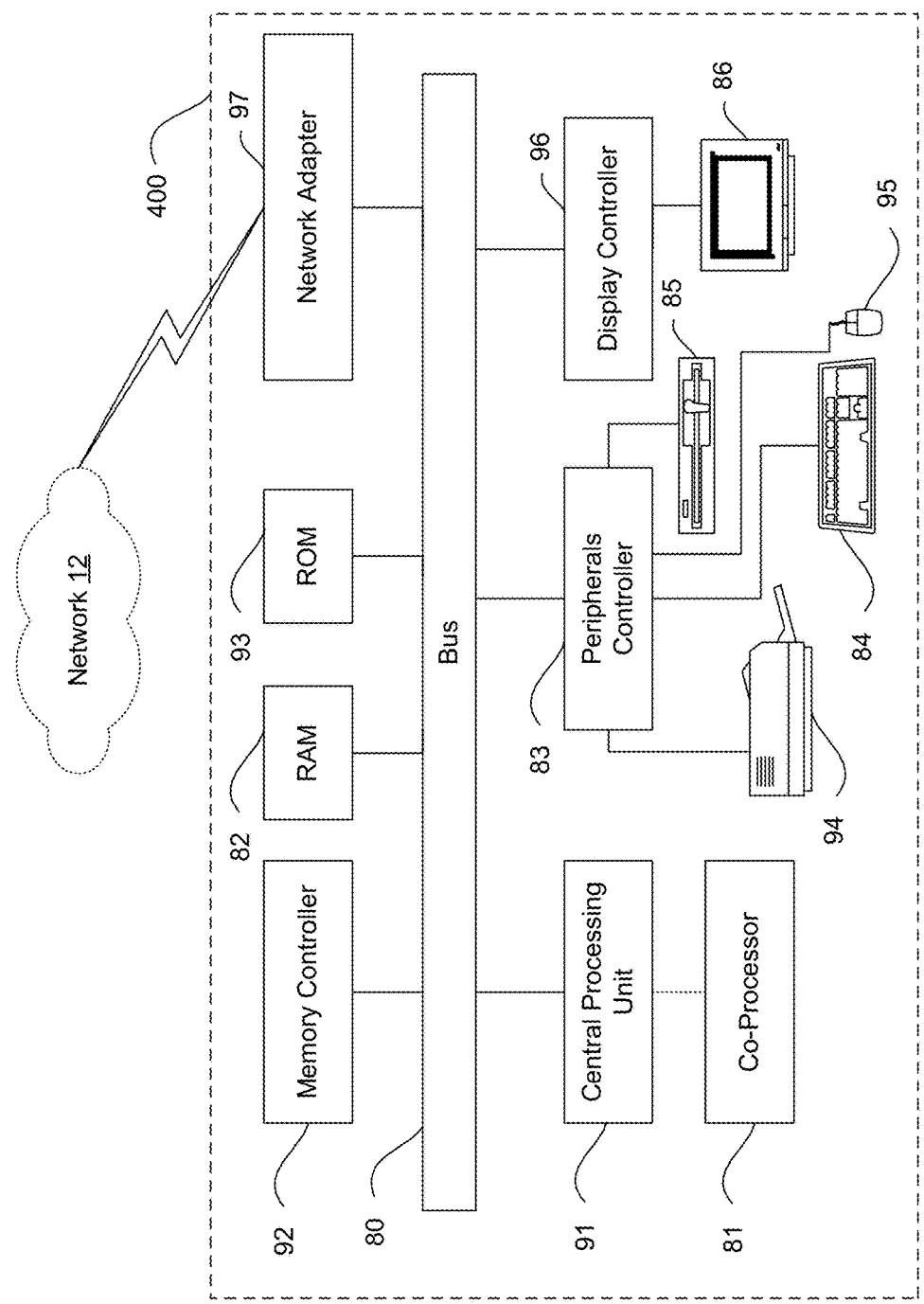
FIG. 4 is a block diagram of an example computing system in which aspects of the communication system of FIG. 1 may be embodied.

FIG. 4 is a block diagram of an exemplary computing system 400 on which, for example, the M2M service platform 22 of FIGS. 1 and 2 may be implemented. Computing system 400 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 400 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process data related to the disclosed device location management and privacy control systems and methods, such as location information and location privacy data.

In operation, CPU 91 fetches, decodes, and executes instructions, and transfers information to and from other resources via the computer's main data-transfer path, system bus 80. Such a system bus connects the components in computing system 400 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 400 may contain peripherals controller 83 responsible for communicating instructions from CPU 91 to peripherals, such as printer 94 disk drive 85, as well as user interface input keyboard 84 and mouse 95.

User interface display 86, which is controlled by display controller 96, is used to display visual output generated by computing system 400 as well as to provide a mechanism to aid a user in providing input to the system 400. Visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 400 may contain network adaptor 97 that may be used to connect computing system 400 to an external communications network, such as network 12. In an embodiment, network adaptor 97 may receive and transmit data related to the disclosed device location management and privacy control systems and methods.

Device Location Management and Privacy Control

Disclosed herein are mechanisms and procedures for device location management and privacy control, which may be implemented in an M2M service layer, such as the M2M service layers 22 and 22' of FIG. 2. In particular, these mechanisms and procedures may be implemented as a service capability (SC) in a service layer, such as in a DSCL, GSCL, or NSCL of the ETSI M2M architecture, in a Service Capability Server (SCS) of the 3GPP MTC architecture, or in a CSF or CSE of the oneM2M architecture. It is understood that such a service capability (SC) may be implemented as a logical entity (e.g., software, computer-executable instructions, and the like) executing either on a standalone server, computer, or other computing device or node in an M2M system or as part of an existing server, computer, or node of such system. For example, the service capability for device location management and privacy control described herein may be implemented on a server or computer such as that having the general architecture illustrated in FIG. 3 or FIG. 4 (described above).

In one embodiment, a device D may report its location to an SC and set up a privacy policy for the location information. In such an embodiment, D may set up the policy that devices in a certain proximity (distance/range), or that devices having a certain relationship in common with the device, can get access to the device's location information. Additionally, the SC may inform D of other devices whose locations are public, and D may then designate which devices can get access to its location information.

In some embodiments, a device D may report its updated location to the SC when it moves from one place to another. Previous location information may be invalidated by the SC, e.g., the SC may send out notifications that old location information previously reported is no longer valid. According to some embodiments, device D may change its privacy policy. If some of the devices that were previously informed of device D's location information no longer satisfy the new privacy policy, the SC may send an invalid location information notification to those devices. A device D's location information may be deleted from the SC. The devices that were previously informed with the device D's location will receive a notification from the SC that may indicate this deletion. A device's location may be retrieved from the SC by other devices (as well as applications or enterprises) if they satisfy the privacy policy of the device location. A device may identify whether it can communicate with another device directly based on the locations.

With the devices' location information managed by the SC, the instant embodiments facilitate new service capabilities. For example, an SC may act as a relay point for device services requests and advertisements. Further, a device may advertise its services to other entities in the proximity by retrieving the device location information from the SC. Alternatively, a device may grant the SC permission to push other devices' location information if it satisfies the privacy policy for those devices. When a device wants to request a service (e.g., a food recommendation) the SC may locate other devices in the proximity that provide the service and, if the location information for the provider of that service is public, forward the request to those provider devices. An SC can also provide a directory of services available based on the location of a device. An SC may further act as intermediary in the provision of a service.

According to other aspects disclosed herein, mechanisms for device location management and privacy control may also serve to facilitate propagating information, such as important updates of an event or disaster, from the SC to other devices in cases where network infrastructure is lost or unavailable for some reason. In another aspect, a device's location may be pushed to other devices to facilitate people's social networking.

Device Location Report

As mentioned above, in an embodiment, a device D may report its location to the SC. The SC may provide the authority to the device to set up a privacy policy for the device D's location information. The interfaces that may be provided by the SC to D for privacy control may depend on one or more policies. Policies that may be used in one or more embodiments include D setting up a distance value, where other devices within the specified distance from D may get access to its location information. Another policy that may be used is having D set up a relationship with one or more other devices that may have access to its location information. For example, the devices' owners may be friends within a social networking application.

A device D may also request identifying data for other devices whose location information is public from the SC by sending a device retrieval message. In order to narrow down the scope of the search for proximate devices performed by the SC, D may specify a distance, such that the SC only returns information on devices within this distance whose location information is public. The SC may have a default distance to use if it is not included in the device retrieval message. D may also specify a relationship such that the SC only returns information on devices that have such a relationship with D. Note that an SC may maintain the relevant semantics. For example, a relationship may be set up for an SC to be a friend to device owners. The SC may find the devices whose owners are friends from a semantics graph maintained by the SC. As another example, the relationship may be that the devices are running the same type of applications (e.g., games). If the devices are in the same vicinity, the devices may find and play against each other.

Figure 5:
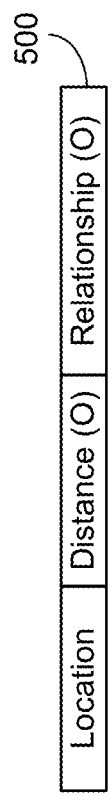
FIG. 5 illustrates an exemplary device retrieval message format.

FIG. 5 illustrates an exemplary format 500 of a device retrieval message that may be sent by a device to the SC to request available location information about other devices. As shown, the message format 500 includes a Location field that specifies the current location of the device requesting location information about other devices. A Distance field may be used to specify a distance from the requesting device's current location within which the requesting device would like to obtain location information from other devices. For example, the requesting device may be interested in receiving location information for other devices located within one mile of the requesting device. The distance value may be specified in a variety of different ways. For example, in one embodiment, the distance value may be specified as distance (e.g., radius) from a centerpoint of the requesting device's location. In another embodiment, the distance may be specified by a certain geographic shape. In yet other embodiments, the distance may be specified as a radio transmission range.

As further shown, the message format 500 may further include a Relationship field in which the requesting device may specify a certain relationship with other devices for which the requesting device wishes to receive location information. For example, the relationship field may specify that the requesting device wishes to obtain location information from other devices whose owners are identified as friends of the requesting device's owner in a given social networking application. As another example, the relationship field may specify that the requesting device wishes to obtain location information from other devices that may be running the same game as the requesting device.

In one embodiment, the Distance and Relationship fields may be optional—as indicated by the designation "(O)" in FIG. 5.

Figure 6:
FIG. 6 illustrates an exemplary device location report message format.

In addition to requesting from the SC location information about other devices, a device D may designate the devices that are permitted to get access to its location information. FIG. 6 illustrates an example format 600 of a device location report that a device may transmit to an SC to specify the devices that are permitted to get access to its location information. As shown, the format 600 includes a Location field that specifies the current location of the device seeking to establish its privacy policy. A Public field may be set to "true" if the device wishes to make its location information public, and it may be set to "false" if the device does not wish to share its location information. A Distance field—which as indicated by the "(O)" is optional—may be used to qualify the public nature of the device's location information. For example, by setting the Public field to "true" and specifying a distance value, the device may establish a policy that allows its location information to be made public to other devices within the specified distance from the device. A Relationship field—which also is optional—may be used to qualify the public nature of the device's location information based on relationship. For example, by setting the Public field to "true" and specifying a particular form of relationship, the device may establish a policy that allows its location information to be made public only to other devices who have the specified relationship with the device (e.g., other device's whose owners are designated as "friends" of the device's owner in a given social networking application). In addition to, or as an alternative to, limiting the public availability of the device's location information based on distance or relationship, the device may also specify particular other devices that may have access to its location information, by including in the device location report message particular identifiers (e.g., DeviceID1, DeviceID2, etc.) of those other devices who are permitted access to the device's location information.

With the embodiment of the device location report format illustrated in FIG. 6, the following privacy modes (policies) of a device's location information may be established.

Totally Public.

In "totally public" privacy mode, a device D does not care who will get access to its location information. In the device location report message as shown in FIG. 6, the Public field is set to be true, the field Distance is set to be infinity. The Relationship field and DeviceID field(s) are left empty. In this mode, the SC is permitted to make D's location information available to any other device, and therefore any other device is able to locate D from the SC.

Public Within Distance.

In "public within distance" privacy mode, a device D is only willing to open its location to devices that are within a certain distance from itself. In the device location report message (FIG. 6), the Public field is set to true, the Distance field is set to the distance configured in or by the device. The Relationship field and the DeviceID field(s) are left empty. In this mode, the SC is permitted to make the location information available to any devices within the configured distance from D. When a device moves into the range, it may trigger the SC to proactively send D's location to the device.

Public With Relationship.

In "public with relationship" privacy mode, a device D is only willing to open its location to devices that have a relationship with itself. In the device location report message (FIG. 6), the Public field is set to be true. The Relationship field is set to be the relationship configured in or by the device. The Distance field may be set to be infinity or to a specified distance configured in or by the device to further limit the devices that may access D's location information. The DeviceIDs are left empty. In this embodiment, the SC is permitted to make location information for the device available to other devices having the relationship with D.

Semi-Public.

In "semi-public" privacy mode, a device D is only willing to open its location to devices designated by itself. In the device location report message (FIG. 6), the Public field is set to public. The Distance and Relationship fields are left empty. The DeviceID1 to DeviceIDn fields are used to indicate the devices that D is willing to open its location information to.

Totally Private.

In "totally private" privacy mode, a device D wants its location information only provided to the SC but not to any other devices. In the device location report message (FIG. 6), the Public field is set to false and all other fields are left empty.

Figure 7:
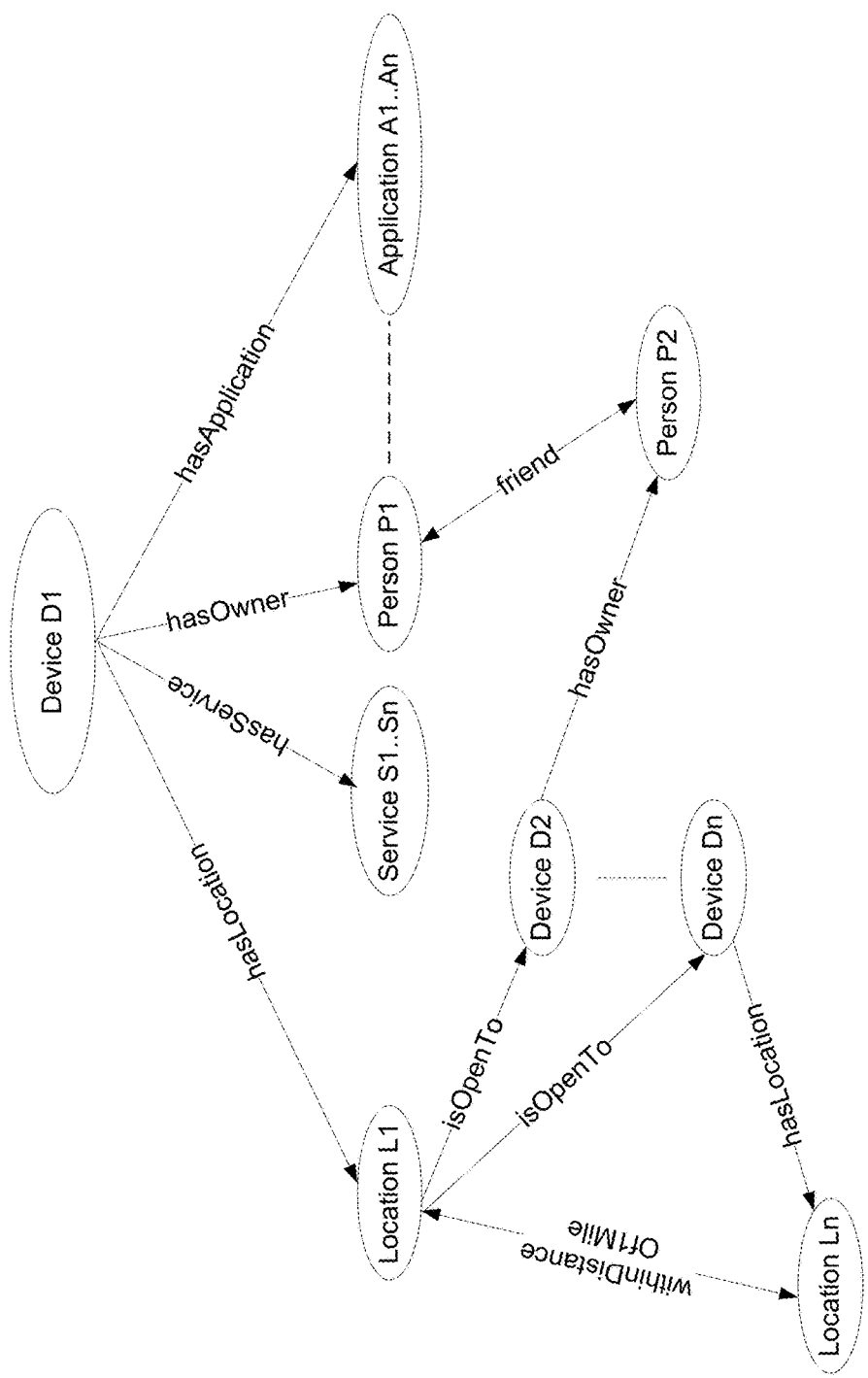
FIG. 7 illustrates an exemplary semantics graph.

FIG. 7 shows exemplary semantics graph that may be maintained by the SC to keep track of the location information and privacy policies of devices from which it has received device location reports, in accordance with one embodiment. The SC may utilize this information when responding to device retrieval messages. In one embodiment, the SC maintains the semantic graph information in a suitable data structure (not shown) within a memory of the server, computer, or other computing device on which the SC is implemented. In the example graph of FIG. 7, a Device D1 may report its location to the SC, which is denoted by Location L1. The Device D1 has an owner Person P1, who is a friend to Person P2. The Location L1 for this device is set up with a privacy policy—for example, via receipt of a device location report message (FIG. 6) from the device D1—such that it is open to devices that are within distance of 1 mile or whose owners are friends to Person P1. Thus, Location L1 may be accessible to Devices D2-Dn that each satisfy the privacy policy of Location L1. For example, Device D2's owner has a friend relationship with Person P1. In another example also shown on FIG. 7, Device Dn has location of Location Ln. Location Ln is within 1 mile of Location L1. Note that the device location report message is extensible to incorporate other policies beyond device location privacy control.

Figure 8:
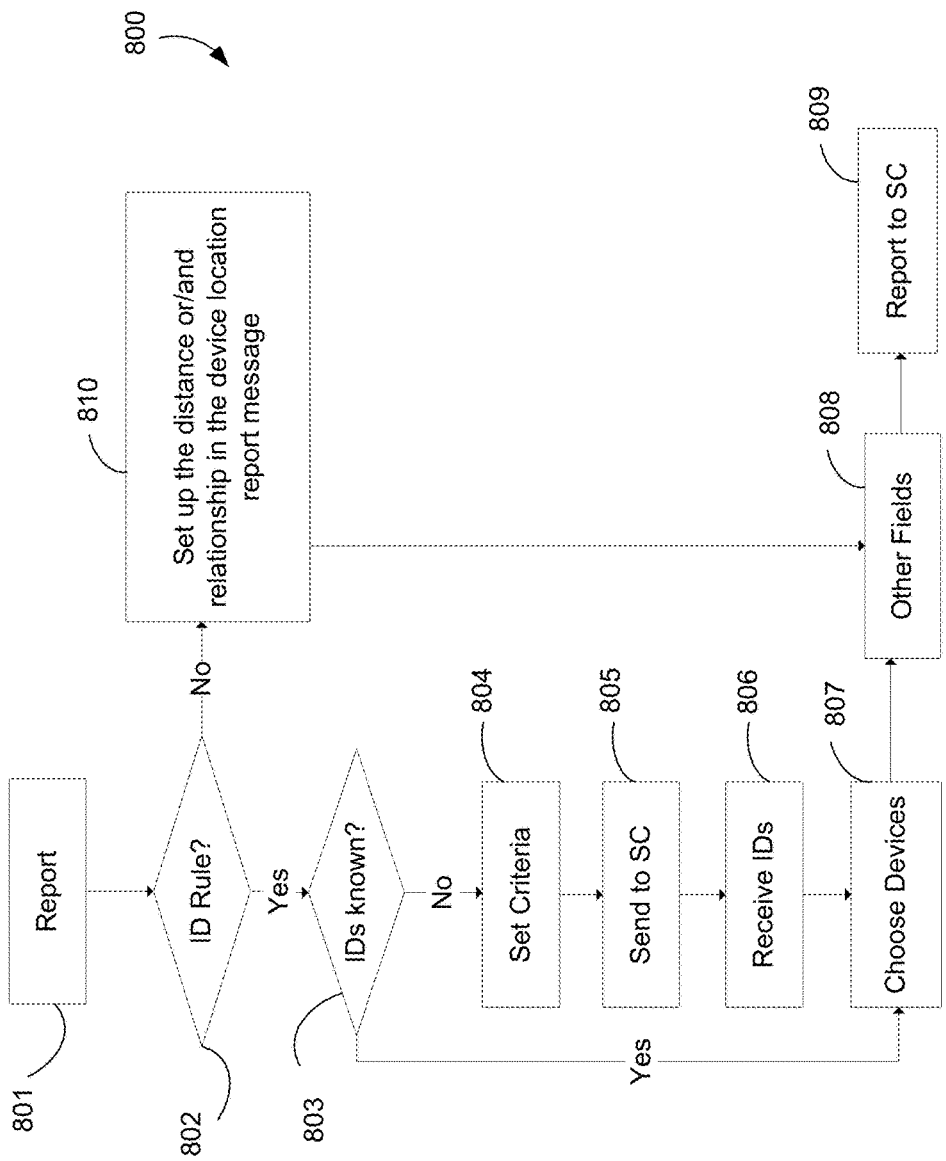
FIG. 8 illustrates an exemplary procedure for sending a location report from a device to an SC.

FIG. 8 illustrates an exemplary procedure 800 for a device creating and sending a location report to an SC. In procedure 800, a device D initially decides in step 801 to report its location information. In step 802, D has the option of specifying the devices that can get access to its location information by enumerating their device identifiers (DeviceIDs). If, in step 802, D chooses to identify specific other devices by their device identifiers, then control passes to step 803, where D checks whether it has knowledge of the other devices' identifiers. If the identifiers are known, D can proceed to step 807 to set up the DeviceIDs in a location report message (i.e., the Device ID fields of the location report message of FIG. 6).

Alternatively, if device D does not have knowledge of the devices that it wishes to allow access to its location information, in step 804 device D can set criteria, such as a distance to device D and/or a relationship to device D. Then, in step 805 device D can send a device retrieval message (e.g., the message of FIG. 5), requesting that the SC identify those devices that meet the selected criteria, for example as specified in the Distance and/or Relationship fields of the device retrieve message. In step 806, device D receives from the SC a list of the device (and their DeviceIDs) known to the SC which meet the criteria. In step 807, device D may choose devices from this list to allow access to its location and put their identifiers in the Device ID fields of the location report message.

Alternatively, in step 810, rather than using DeviceIDs, device D can set up criteria regarding distance and/or relationships to be communicated to the SC—by specifying appropriate distance or relationship criteria in the Distance and/or Relationship fields of the location report message (FIG. 6). In either case, in step 808, device D may add other criteria or information to its location report message to the SC before sending it in step 809.

Figure 9:
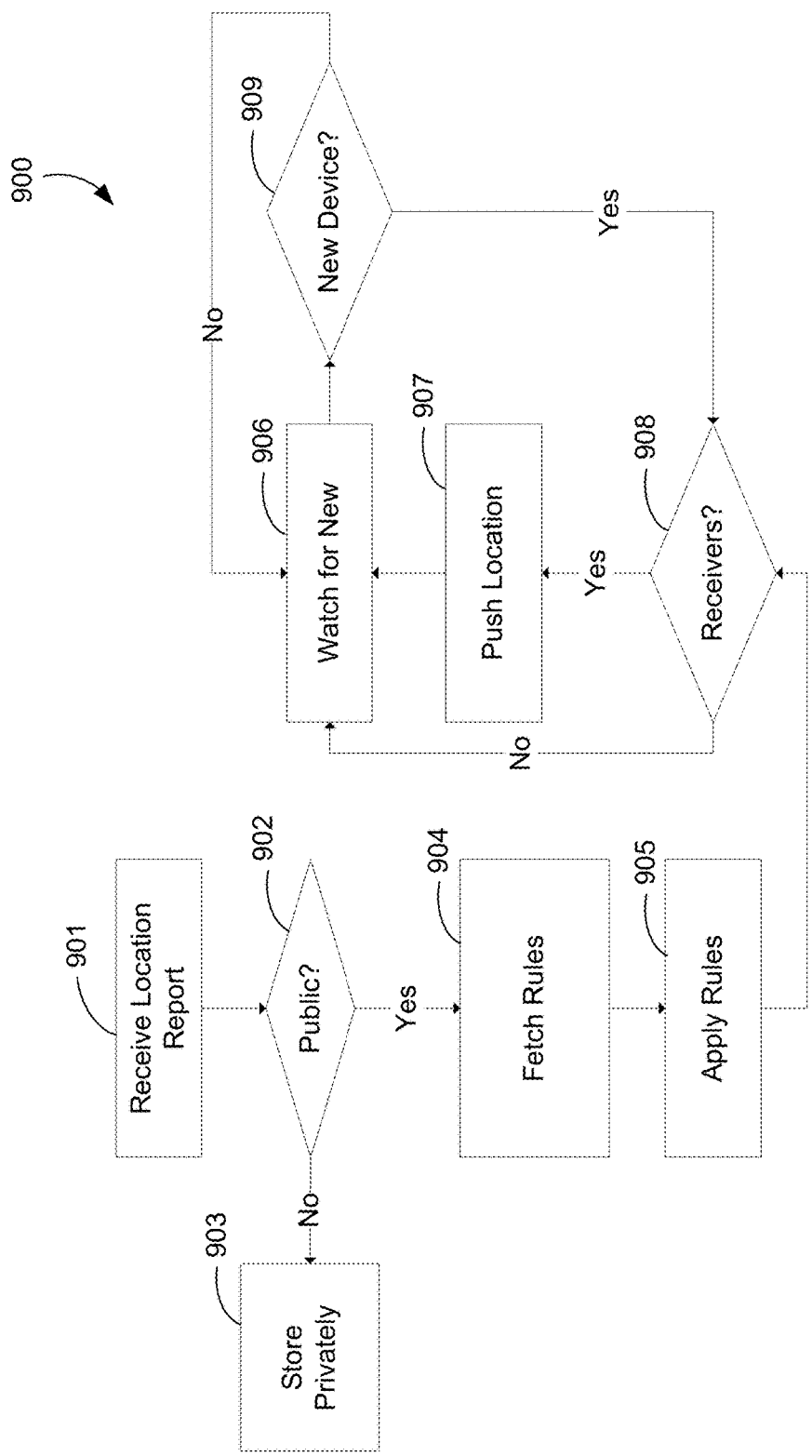
FIG. 9 illustrates an exemplary procedure for receiving a location report from a device at an SC.

FIG. 9 illustrates an exemplary procedure 900 for an SC receiving the device location report message from a device D. In step 901, the SC receives a location report from a Device D. In step 902, the SC checks whether the "Public" field (FIG. 6) is set to "true" or "false". If the location information is not public (Public field set to "false"), in step 903 the SC stores the location information for the device D privately and does not let any other devices have access to D's location information.

If the location information is public (Public field set to "true"), in step 904 the SC extracts and stores any criteria (e.g., Distance, Relationship, or DeviceIDs fields) to be used in regard to the location information of device D from the location report received from device D. These rules effectively establish the privacy policy of device D, as discussed above in connection with FIG. 6. In step 905, the SC applies the privacy policy. For instance, the SC here may check the distance and relationship between device D and the other devices known to the SC. The SC selects the devices that satisfy the privacy policy from the semantics graph (e.g., FIG. 7) that it maintains for the devices.

In step 908, the SC checks whether any of the selected devices are set to receive other devices' location information. If a selected device is set to let the SC inform them of new device location information from device D, in step 907 the SC will push D's location information to that device.

In step 906, the SC may periodically or continuously check statuses of devices which may meet the criteria of the privacy policy. In step 909, the SC decides whether a new device is detected. For example, a new device may meet the criteria it moves into the range (i.e., Distance) in the privacy policy of Device D. If so, the SC proceeds again to step 908, and so on, to push device D's location information to the new device. Alternatively the SC may act on an external client to request location information proactively from an underlying network.

Device Location Update

When a device D moves from its current location, it may need to update its location information to the SC by sending a location report message to the SC. If the SC is able to detect the movement of device D and retrieve device D's new location information from a service providers or network operator (e.g., the SC interfaces with the underlying access network's location function/service), the SC may automatically update D's location information and follow the original privacy policy set up by D initially. The SC may inform the other devices that were provided with D's old location information that D's location is no longer valid. Note that, when device D may move to the new location, the devices that satisfy the privacy policy may change. For D's new location, there may be another group of devices that may be permitted to access device D's location information.

Figure 10:
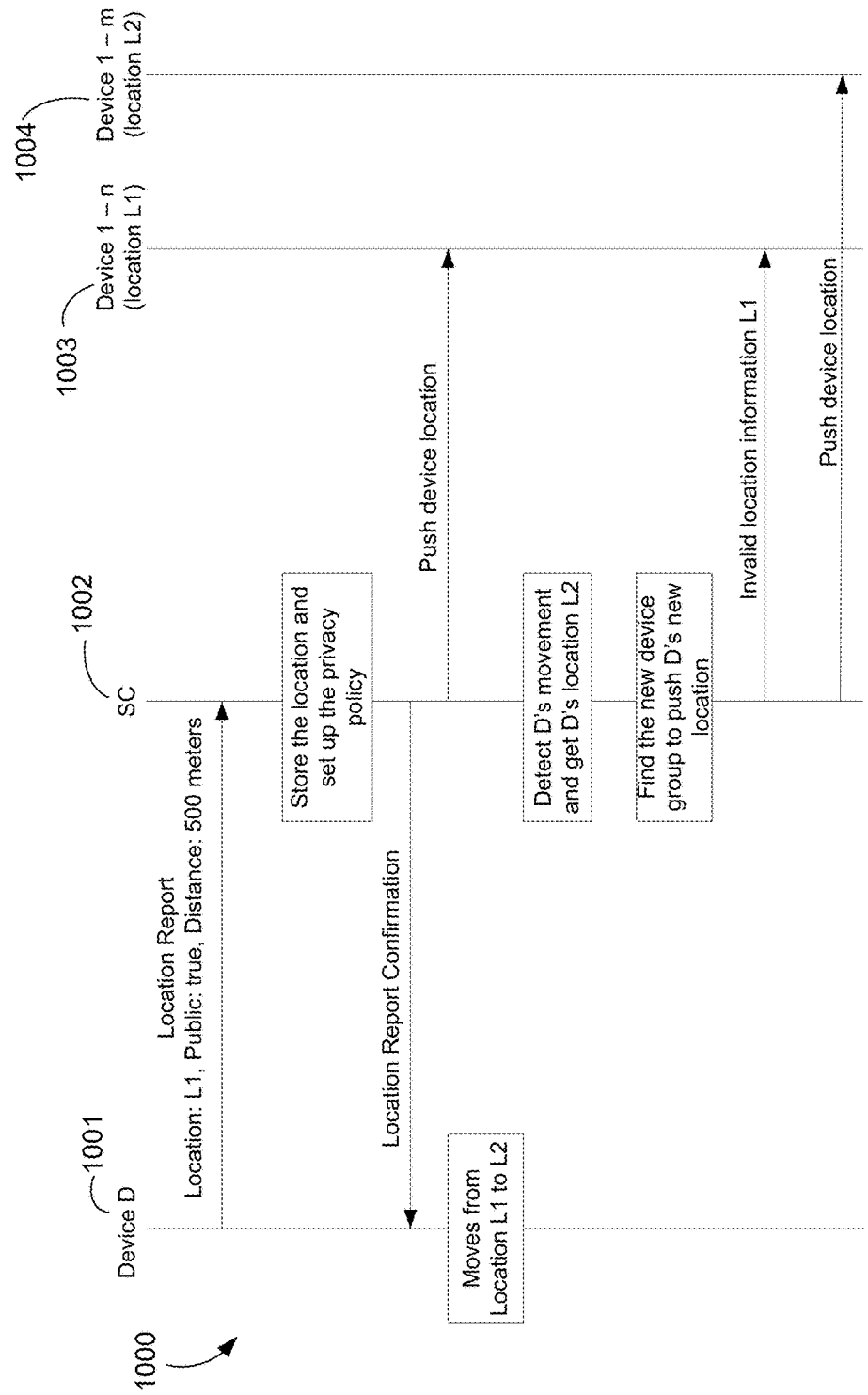
FIG. 10 illustrates an exemplary signal flow during a device location update.

FIG. 10 illustrates exemplary message flow 1000 that may be implemented during a device location update when a device D 1001 moves from old location L1 to new location L2 according to an embodiment. Device D 1001 sends an initial location report including: its location L1; an indication that this information is public; and a policy that the information may be shared with other devices within 500 meters. SC 1002 stores all this information. Then SC 1002 sends a message to device D 1001 confirming receipt of the location report. Applying the location policy of device D 1001, SC 1002 pushes the location information of device D 1001 to device 1-*n* 1003 which is also at L1, i.e., in the proximity of device D 1001 according to the privacy policy of device D 1001. However, at this time SC 1002 does not push the location information of device D 1001 to device 1-*m* 1004 because device 1-*m* 1004 is not in the proximity of device D 1001.

Next, device D 1001 moves from location L1 to location L2. SC 1002 detects this movement and gets the new location L2 of device D 1001 using a context management service. For example, the context management service may be able to detect the device mobility and acquire the device's new location due to the mobility. SC 1002 then reapplies the privacy policy originally setup by device D 1001 and determines that device 1-*n* 1003 no longer meets the criteria of the privacy policy, but device 1-*m* 1004 now does. Accordingly, SC 1002 sends an invalid location message to device 1-*n* 1003. SC 1002 does not tell device 1-*n* 1003 the new location of device D 1001. It merely informs device 1-*n* 1003 that the previously received location information for device D 1001 is no longer valid. In addition SC 1002 pushes the location of device D 1001 to device 1-*m* 1004.

A device location report message may be bound to one or more existing protocols, such as Hypertext Transfer Protocol (HTTP), Constrained Application Protocol (CoAP), etc. Other messages described herein may also be bound to HTTP, CoAP, or other protocols. Protocols such as HTTP or CoAP may be used as an underlying transport protocol for carrying such messages. The messages can be encapsulated within the payload of HTTP/CoAP messages or alternately some information within the messages can be bound to fields within the HTTP/CoAP headers and/or options. For example, in one embodiment, the messages may be encoded as JavaScript Object Notation (JSON) or Extensible Markup Language (XML) descriptions that may be carried in the payload of HTTP or CoAP requests.

Device Location Privacy Policy Update

Figure 11:
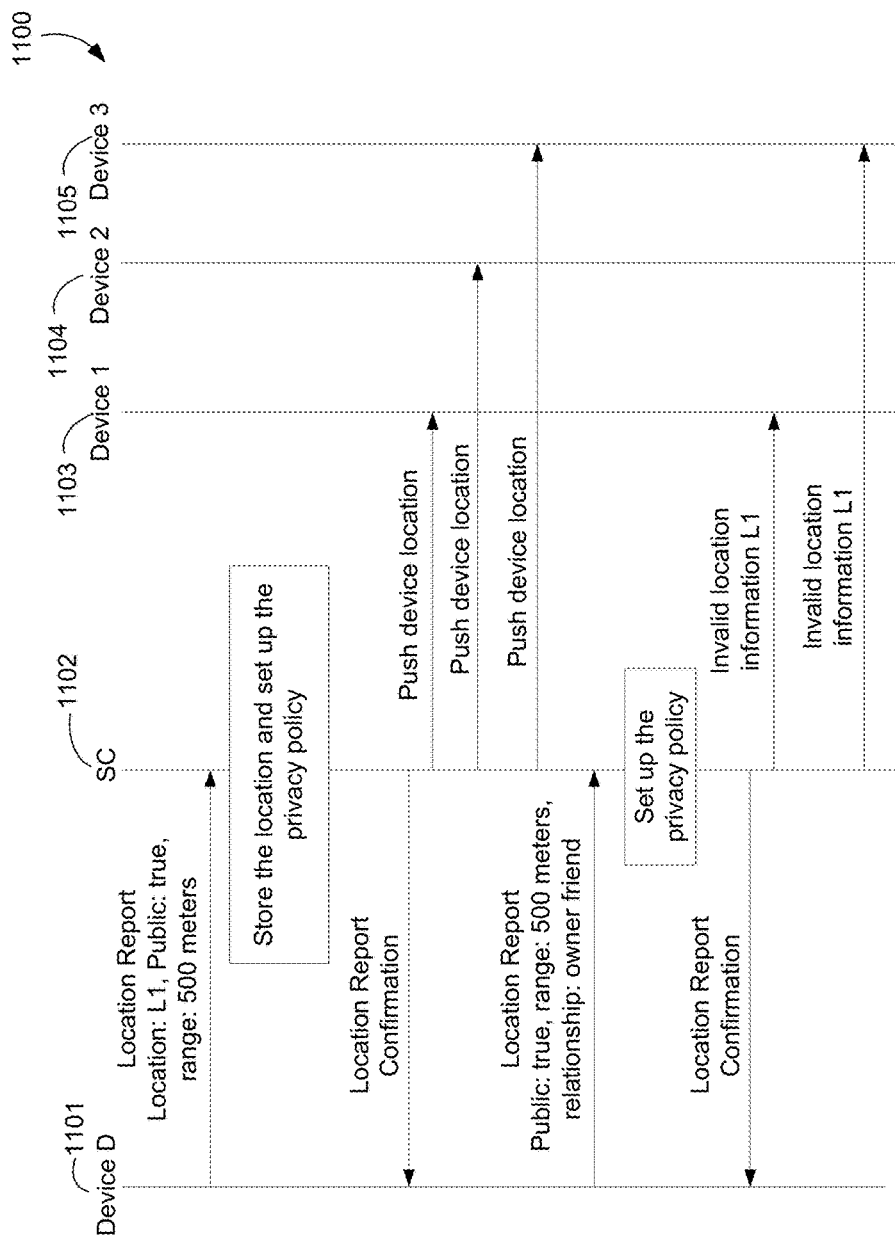
FIG. 11 illustrates another exemplary signal flow for a device setting and resetting a privacy policy for its location information.

A device D may reset a privacy policy for its location information by changing the fields in the location report message. If some of the devices that were previously informed of device D's location information no longer satisfy the new privacy policy, the SC may send invalid location notifications to those devices. Those devices then delete the invalid location information for Device D. FIG. 11 illustrates exemplary signal flow 1100 providing an example of such a scenario. A device D 1101 sends an initial location report including: its location L1; an indication that this information is public; and a policy that the information may be shared with other devices within 500 meters. SC 1102 stores all this information. Then SC 1102 sends a message to device D 1101 confirming receipt of the location report. Applying the location policy of device D 1101, SC 1102 pushes the location information of device D 1101 to device 1 1103, device 2 1104, and device 3 1105, in accordance with the privacy policy of device D 1101.

Figure 16:
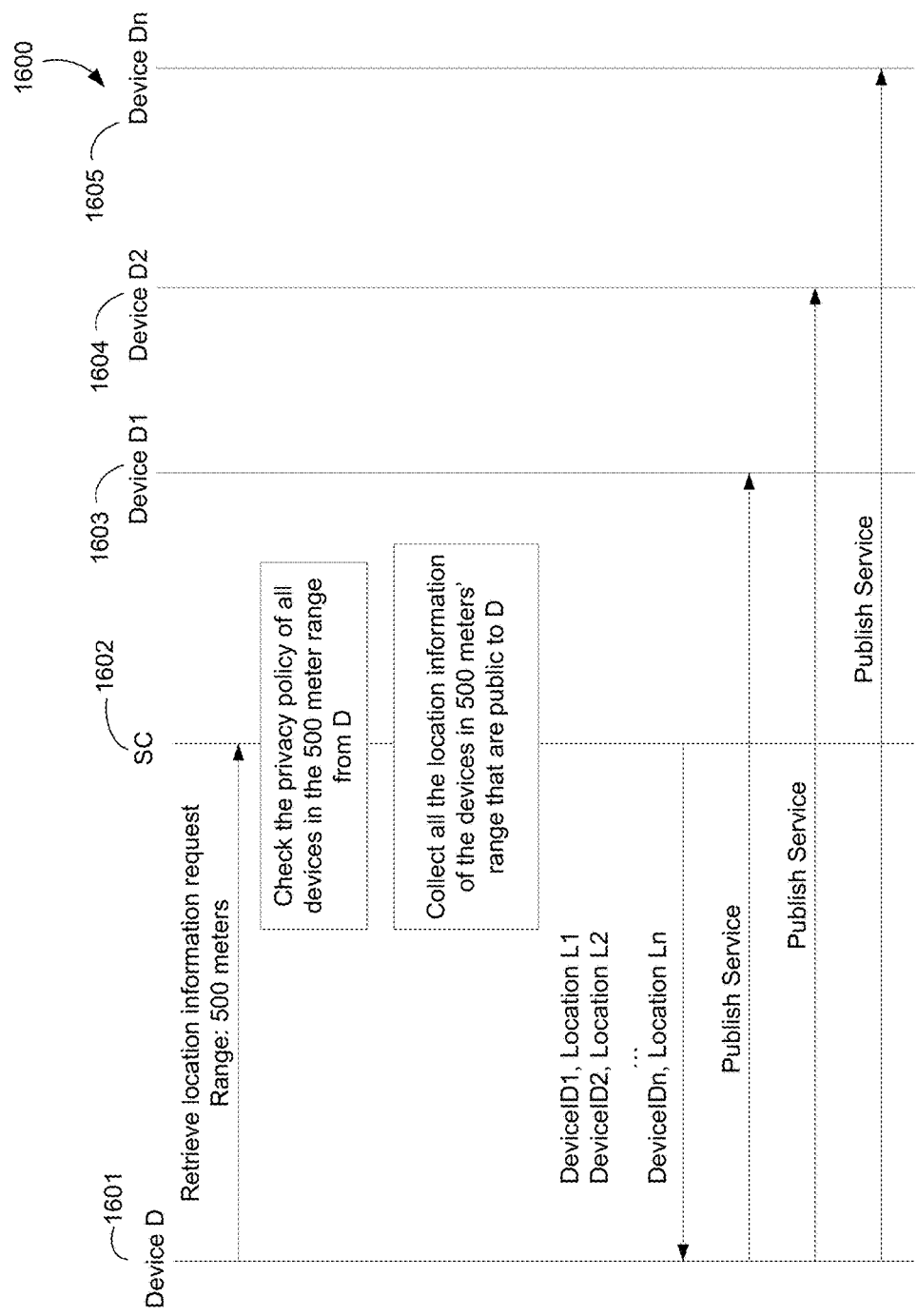
FIG. 16 illustrates an exemplary signal flow for a device advertising a service directly.

Next device D 1101 changes its location privacy policy by adding another rule (e.g., relationship) in a new location report message. If the location of device D 1101 remains the same, the location representation may not necessarily be included in the message. SC 1102 sets up the new privacy policy and sends confirmation of receiving the location report. Such a new rule may result in fewer devices having access to the location of device D 1101. In the example of FIG. 16, only device B 1104 satisfies the new privacy policy. Therefore SC 1102 sends an invalid location information message to the device 1 1103 and device 3 1105, such that they will not regard the device D's location received before to be valid. Device 1 1103 and device 3 1105 then delete the invalid location information for device D 1101.

Device Location Deletion

Figure 12:
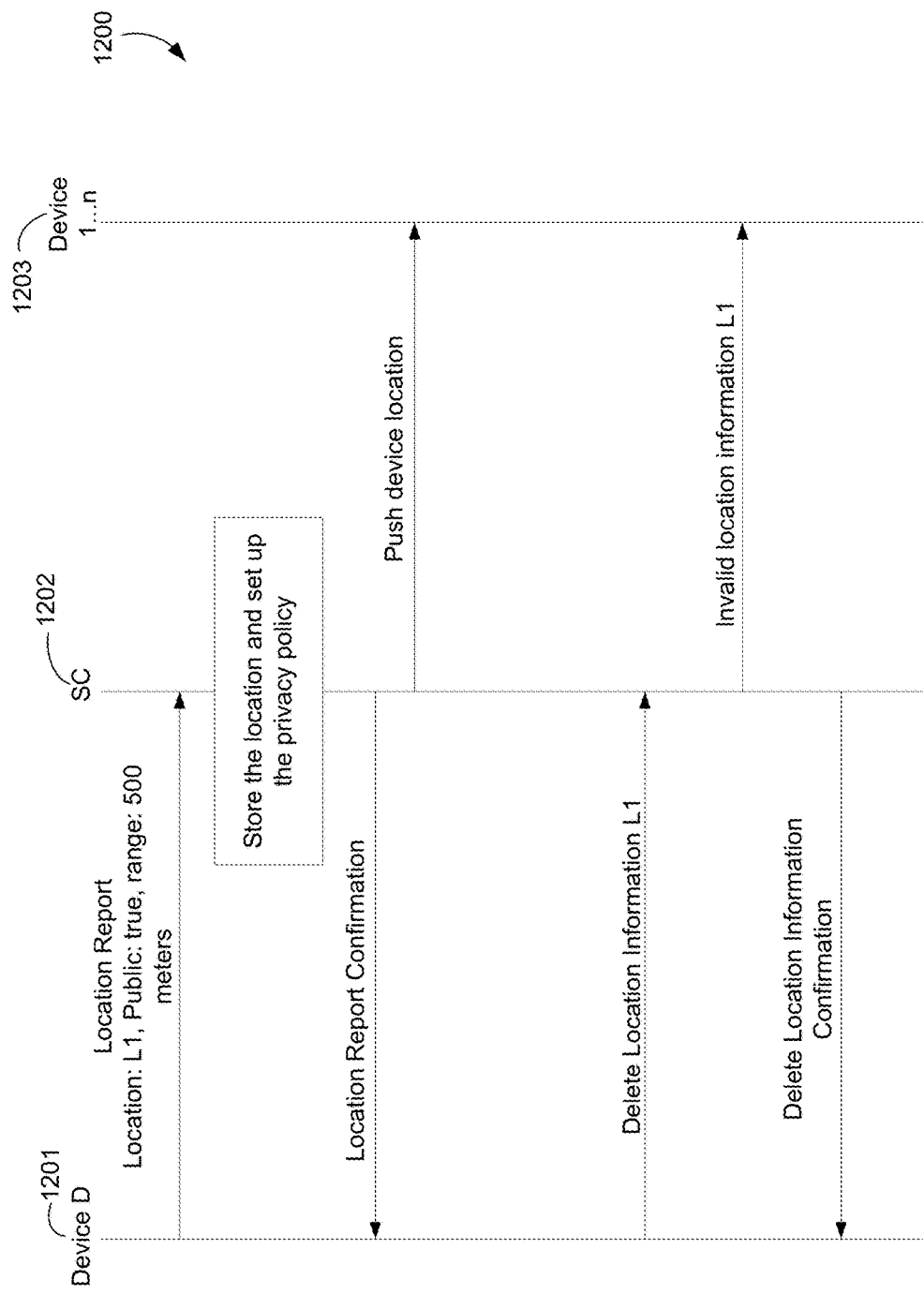
FIG. 12 illustrates an exemplary signal flow for a device deleting its location information.
Figure 17:
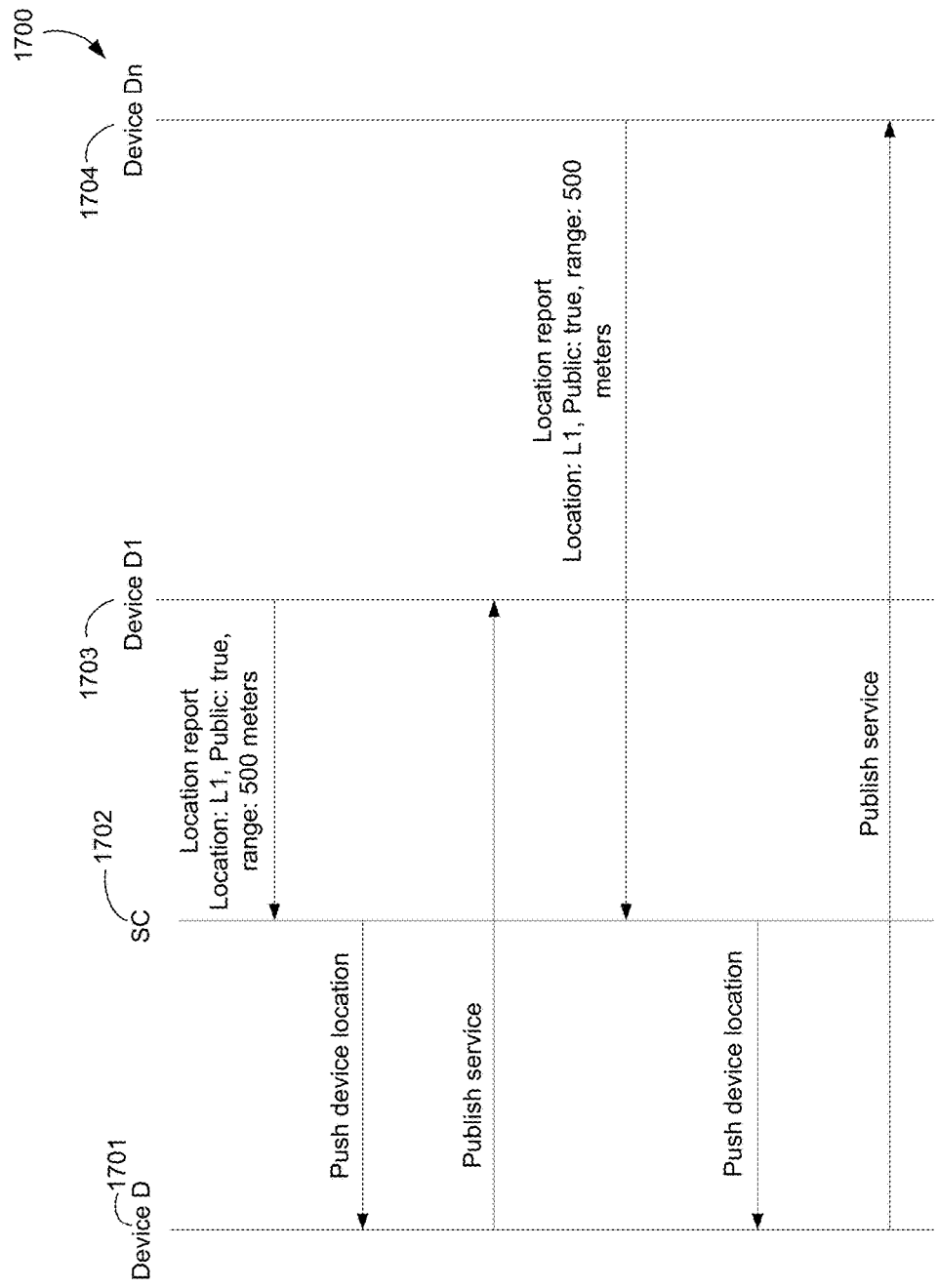
FIG. 17 illustrates an exemplary signal flow for a device advertising a service with the assistance of an SC.

As shown in FIG. 12, in an exemplary signal flow 1200, a device D 1201 may also request that an SC 1202 delete its location information. Then the location information of the device D 1201 that was published to other devices will be considered invalid. FIG. 17 shows the initial location report being sent to SC 1202. SC 1202 then stores the policy, sends a confirmation, and in accordance with the policy pushes the location information to devices 1 . . . n 1203. Then SC 1202 receives a request to delete its location information, and responds by sending an invalid location message to devices 1 . . . n 1203, and a confirmation of receiving the request to requesting device D 1201. Devices 1 . . . n 1203 then delete the invalid location information for Device D 1201.

Device Location Retrieval

Figure 13:
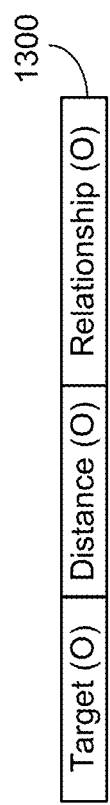
FIG. 13 illustrates an exemplary message format for a device to retrieve another device's location information.

A device may retrieve another device's location information from an SC if it satisfies the privacy policy set up by the target device. FIG. 13 illustrates an exemplary format 1300 for a device location retrieval location message that may be used for this purpose. As shown, the device location retrieval message 1300 may include a Target field for specifying a target device identifier, a Distance field for specifying a distance within which the device's location is of interest, and a Relationship field for specifying a relationship the device has with the source device whose location is of interest. As shown, in one embodiment, each field is optional. The device location retrieval message may be extended to include other rules.

Figure 14:
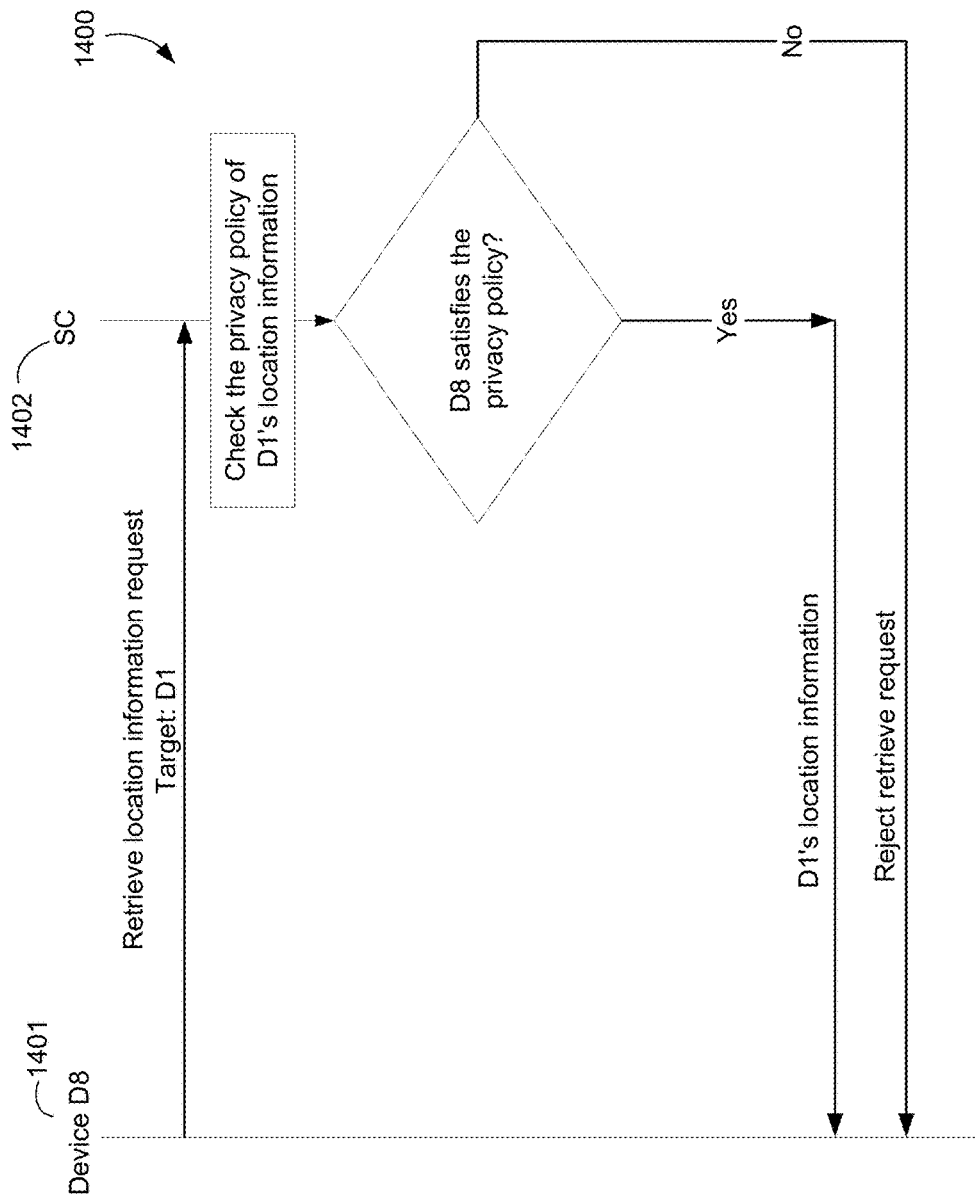
FIG. 14 illustrates an exemplary signal flow for a device retrieving another device's location information from an SC.

FIG. 14 shows an exemplary signal flow 1400 where a device D8 1401 attempts to retrieve D1's location information from an SC 1402 by sending a retrieve location information request. SC 1402 protects the privacy of D1's location information by always checking the policy before responding to any retrieval request it receives. If device D8 1401 is permitted by the policy of device D1 to receive the location information, SC 1402 sends D1's location information. Otherwise SC 1402 sends a message to device D8 1401 rejecting the request.

The device locations retrieved from the SC 1402 may be used by device D8 1401 to determine whether it is in the direct communication distance of other devices. If so, device D8 1401 may communicate with them directly. Device D8 1401 may also move to a new location where it tries to communicate with another device directly. In some cases, even though two devices are within direct communication distance, they may not be able to communicate. This may be because there is an obstacle between them or one of the devices has changed its position such that they cannot communicate directly.

Service Capabilities Enabled by Device Location Management

Figure 15:
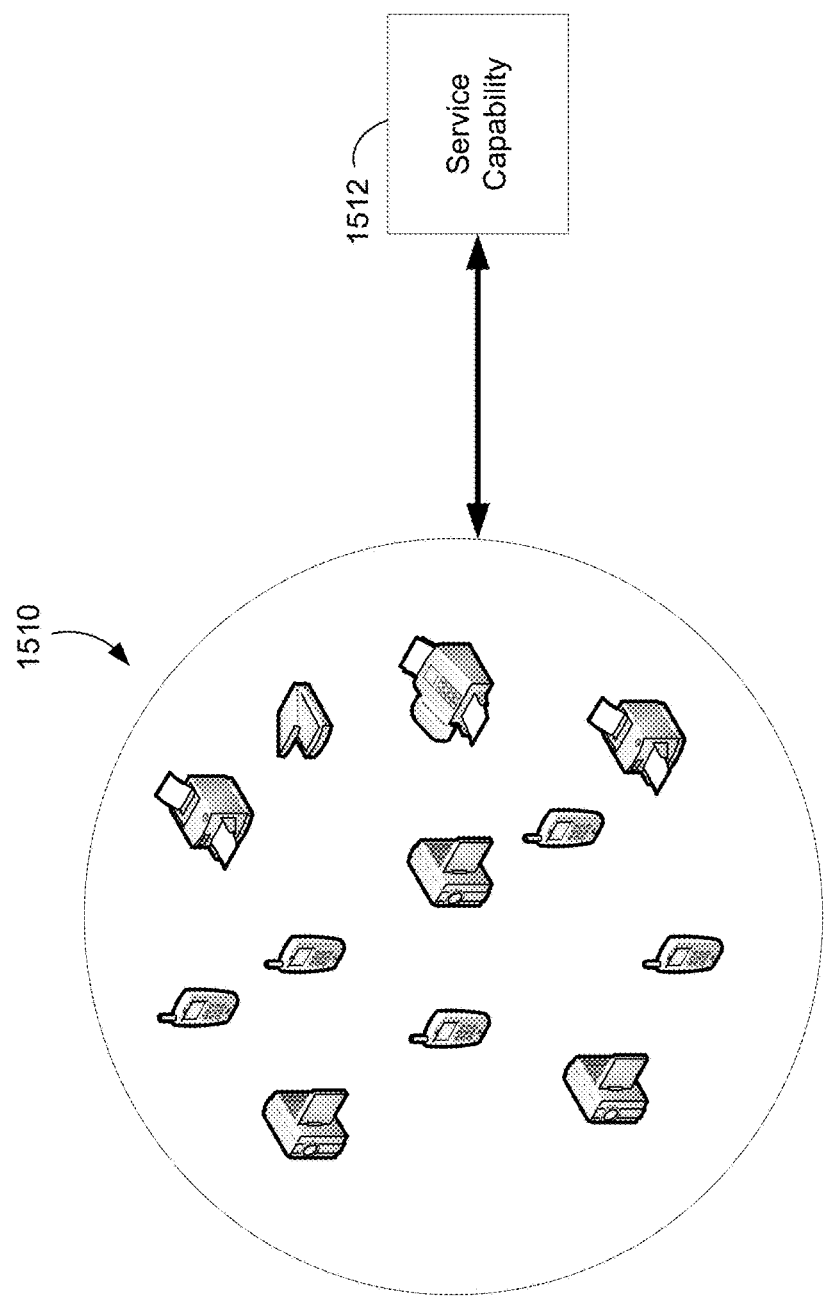
FIG. 15 illustrates an exemplary device deployment.

FIG. 15 illustrates an exemplary device deployment where, according to an embodiment, devices 1510 may interact with an SC 1512 for location information management as described herein. With centralized management and privacy control by the SC, the SC may receive from a device its supported services and advertise such services to other devices in the proximity. A device may locate the service that is supported by other devices in the proximity through the SC's advertisements. A device may then request a service from another device through the SC after locating the service. The SC may forward the service data from the service device to the requester device and switch the communication mode from indirect to direct if it finds out they are in the direct communication range based on their locations, and vice versa.

Device Service Advertisement

A device D may advertise its supported services to the SC and to other devices in the proximity through the SC. The device D may want to advertise its services to devices in the proximity because the services target devices nearby only, for example, location related services such as printing, merchandise recommendations, etc. Initially, D may have no knowledge of whom its service should be advertised to. The device D may make a device location retrieval request to the SC and the SC may return the devices with public location information to device D. Device D may pick the devices that are in the appropriate distance or with a certain relationship to D to advertise its services. Alternatively, device D may allow the SC to push other devices' location information if it satisfies the relevant privacy policy.

FIG. 16 shows exemplary signal flow 1600 for device service advertisement enabled by active device location retrieval by a device that provides the services. A device D 1601 sends a message to an SC 1602 requesting information on devices according to certain rules, e.g., devices within 500 meters of the location of device D 1601. Before sharing any information about other devices, the SC 1602 checks the privacy policy of the other devices, D1 1603, D2 1604, and Dn 1605, about which it has information. Then SC 1602 checks which of the other devices accord with the rule provided by device D 1601. It then sends to device D 1601 a directory of the devices that meet the criteria and the location of each such device. Device D 1601 then publishes a service to the devices listed in the directory, in this case devices D1 1603, D2 1604, and Dn 1605.

FIG. 17 shows an exemplary signal flow 1700 of device service advertisement enabled by an SC 1702 pushing the location of device D1 1703 to a device D 1701 which provides the services in accordance with a privacy policies received by SC 1702. SC 1702 thus enables device D 1701 to target certain devices in the proximity and advertise its services directly to them. On learning the location of device D1 1703, device 1701 publishes its service directly to device 1703. This process is repeated when device Dn 1704 reports its location to SC 1702 along with a privacy policy which permits sharing the location information with device D 1701.

Figure 18:
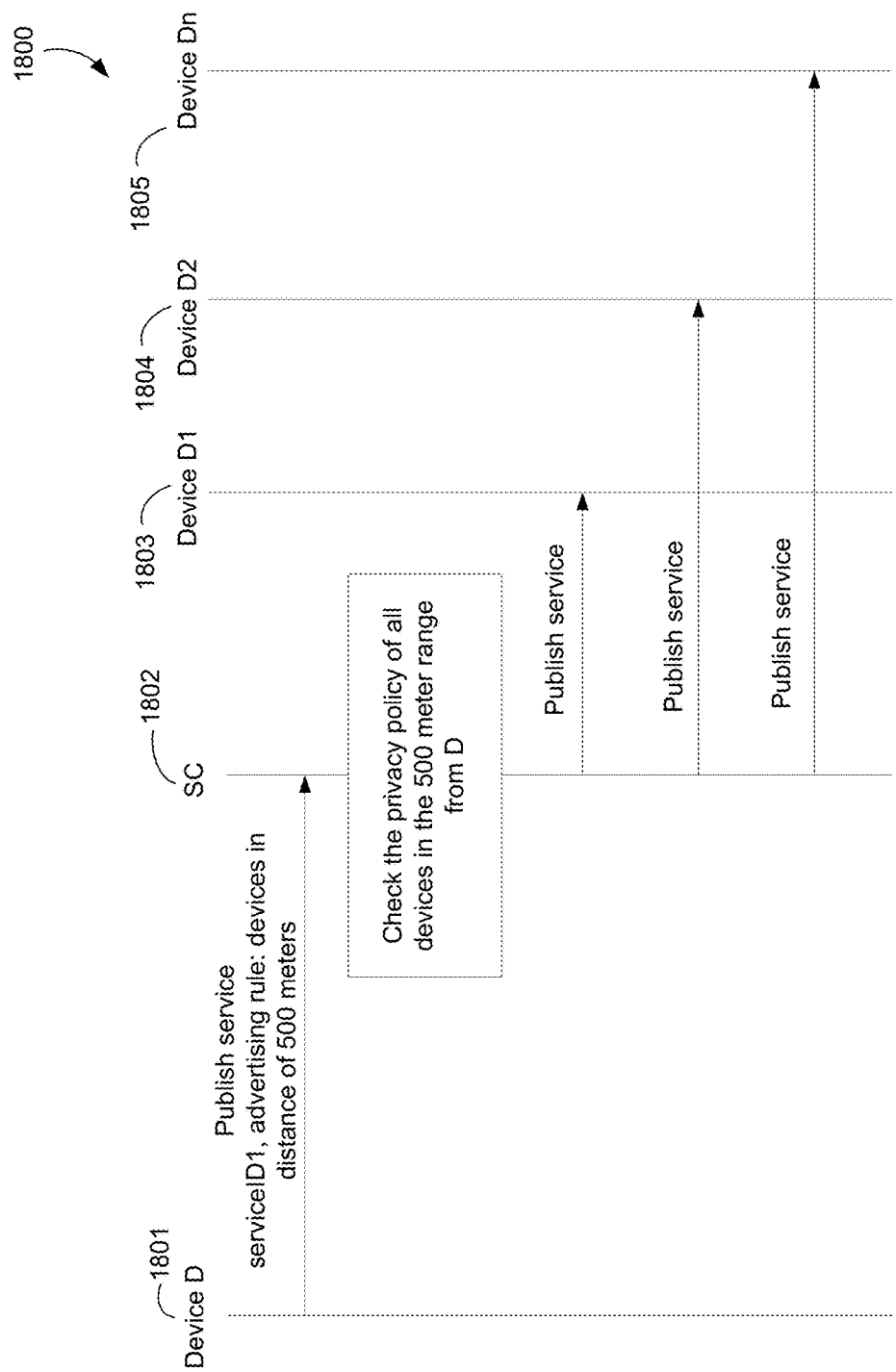
FIG. 18 illustrates an exemplary signal flow for a device advertising a service through an SC.

Alternatively, as depicted in FIG. 18, a device D 1801 may grant an SC 1802 permission to advertise services on its behalf by setting up a service advertising rule when it publishes its services to SC 1802. SC 1802 then applies the advertising rule and checks privacy policy of devices meeting the criteria of the rule. SC 1802 then publishes the service of device D 1801 to those devices that meet the criteria of the advertising rule and permit such publication under their own privacy policy. In this case SC 1802 publishes to the service to devices D1 1803, D2 1804, and Dn 1805.

Figure 19:
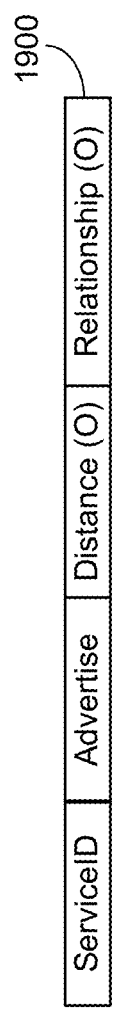
FIG. 19 illustrates an exemplary message format for a device publishing a service to an SC.

FIG. 19 shows exemplary format 1900 that may be used in an embodiment for a service publishing message that may be sent from a device to an SC. The ServiceID field contains the published service's unique identifier, which may be mandatory. The Advertise field indicates whether the service is to be advertised further by the SC. The Distance and Relationship fields are optional and may be used to set up an advertising rule.

Device Service Locating and Request

Figure 20:
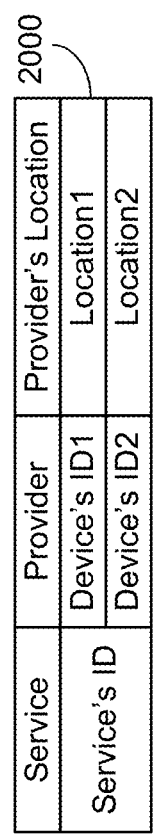
FIG. 20 illustrates an exemplary directory of devices offering services.

A device may be able to locate a service that is supported by other devices in the proximity through an SC. The device may request a service from another device through the SC after locating the service. The SC may build a service directory based on the devices' published services and their location information. FIG. 20 illustrates an exemplary directory 2000. As shown, in this embodiment, the directory may identify one or more services by their respective identifiers (Service ID) in a Service column, and for each such service, the directory may further specify, in a Provider column, the device ID(s) of the device(s) that provide that service. The location of each device (e.g., Location1, Location 2 in FIG. 20) may also be specified in a Provider's Location column.

Figure 21:
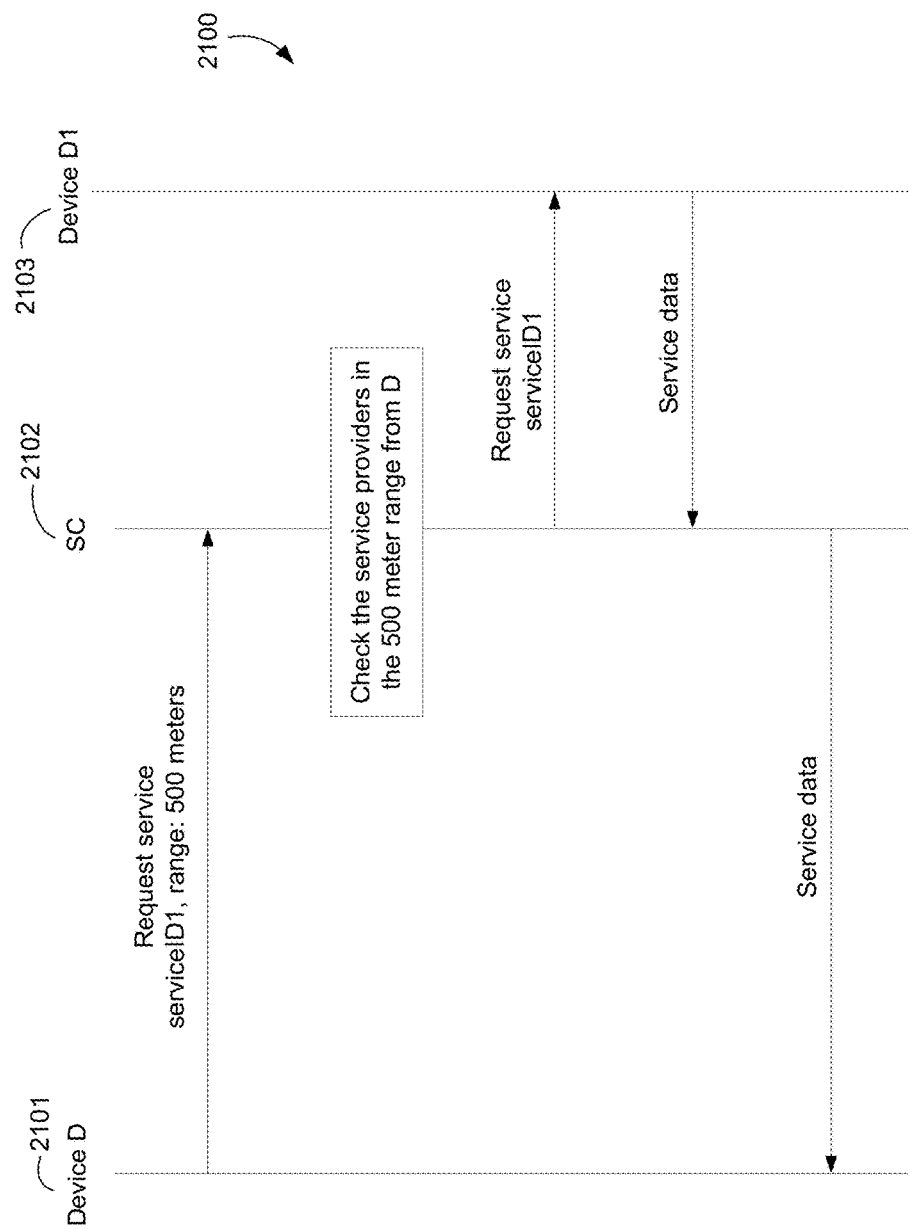
FIG. 21 illustrates another exemplary signal flow of a service request and response between two devices through an SC.
Figure 23:
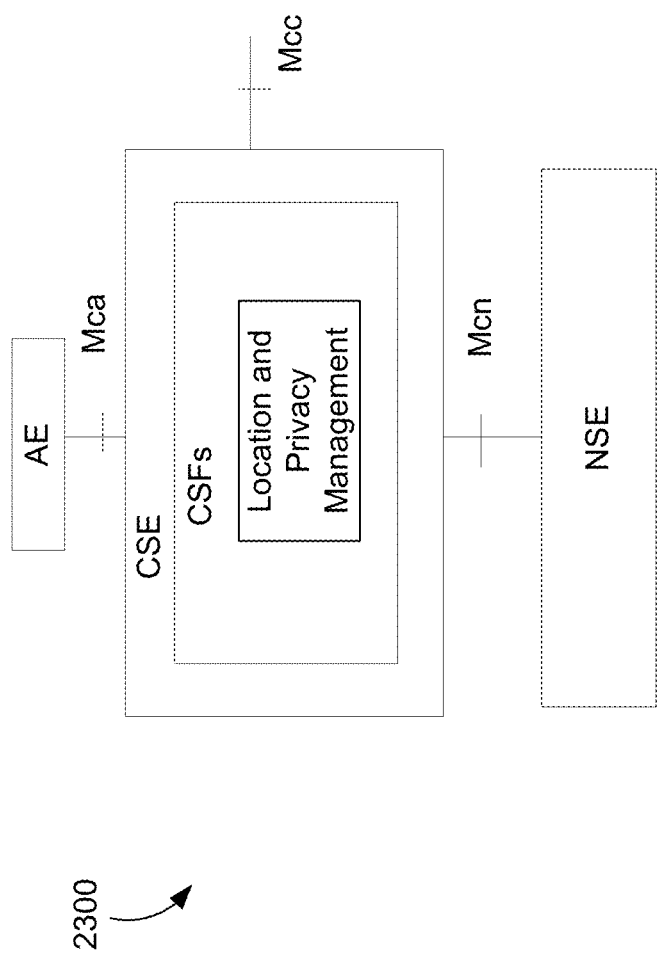
FIG. 23 illustrates an embodiment of location management and privacy control in a oneM2M Resource-Oriented Architecture (ROA).

FIG. 21 shows an exemplary signal flow 2100 illustrating an example of a service request and response between two devices through an SC 2102. A device D 2101 sends a service request to SC 2102 with a rule which requires that the service provider needs to be within 500 meters from device D 2101. For example, the user of device D 2101 may want to get a food recommendation from users of other devices in the same restaurant. SC 2102 locates a service provider, device D1 2103, satisfying the requirement and forwards the service request to it. Device D1 2103 may then respond directly to device D 2101 or alternatively, as depicted in FIG. 23, SC 2102 may also act as a relay point for the service data from device D1 2103 to device D 2101.

Example Use Cases

Figure 22:
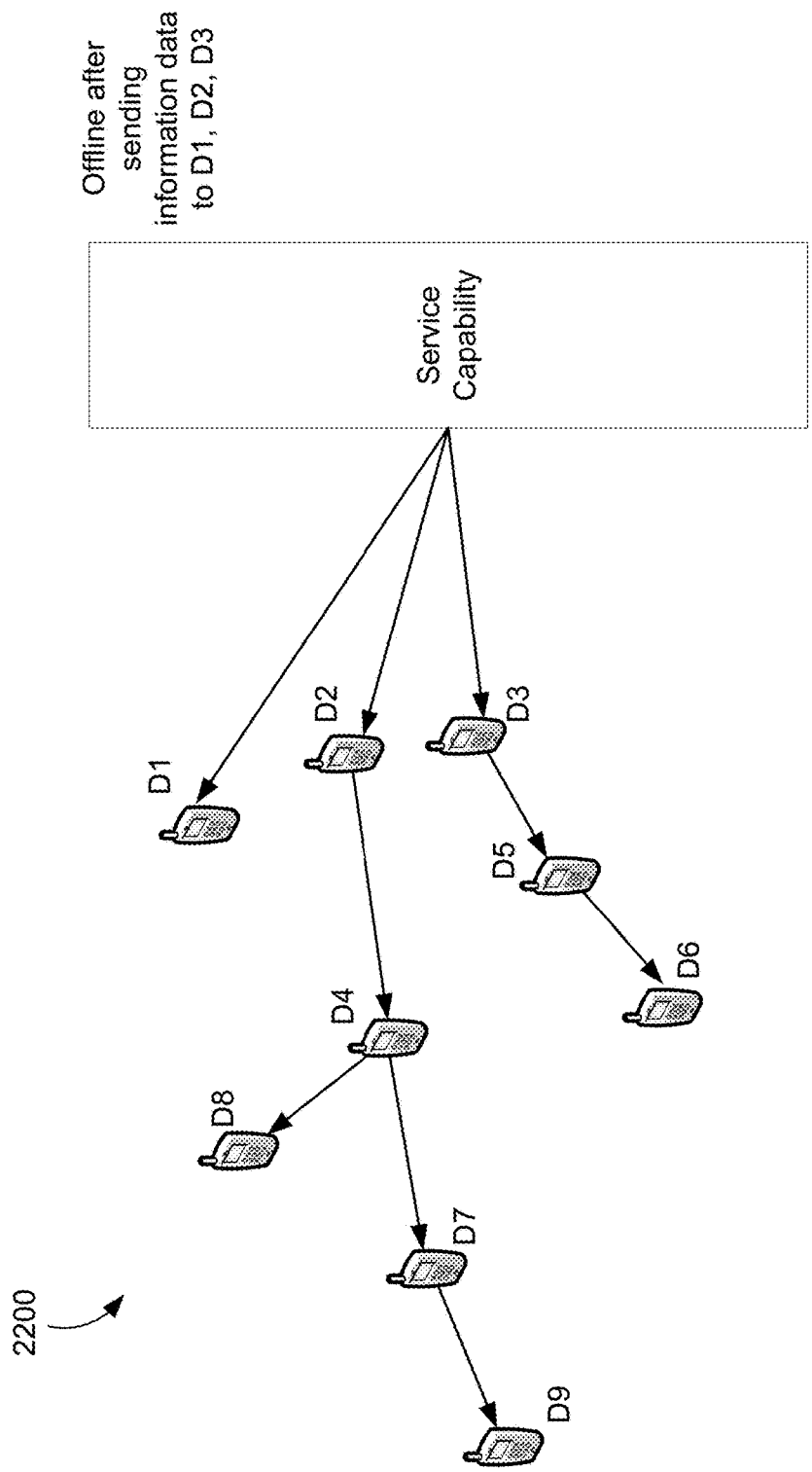
FIG. 22 illustrates an exemplary system in which data propagation may be performed in a disaster situation.

FIG. 22 illustrates an exemplary system 2200 in which data propagation may be performed in a disaster situation. When a disaster occurs, victims may need support in obtaining important information, such as updates on the disaster, rescue information, food supply, etc. However the ability of victims to obtain information through normal channels may be hampered due to damage or intermittent availability of communications infrastructure.

In FIG. 22, an SC is able to send data to a limited number of devices, D1, D2, and D3. However, from location information previously provided by the SC, D2 may know D4 is nearby and D3 may know that D5 is nearby. Therefore D2 may forward the data to D4 and D3 may forward it to D5. The data may thereby be propagated to many or all devices in the affected area in a similar fashion. In addition, if there are still other devices that are outside of the affected area, if they are in communication reach of some device in the area, (for example, D9), the data may be forwarded to them by devices within communication reach.

An SC may also serve as a platform for devices to set up the location pushing rules that may be based on each device's needs. For example, in social networks, a device may want to know when another device shows up in the same neighborhood if the device owners are friends and willing to know that they may have the chance to meet. In another example, during a conference or group meeting, attendees may be interested in particular topics and may want to have discussions with other attendees about the topics. By establishing a relationship between users that have an interest in a same topic, an SC may inform people at the conference or meeting of other attendees who have an interest in the same topic, thereby facilitating discussions on that topic. These are merely two examples of how the presently disclosed embodiments may improve communications, and one skilled in the art will readily recognize that there are many other applications of the disclosed embodiments.

Additional Embodiments

OneM2M Resource Oriented Architecture (RoA) Embodiment

As mentioned above, the oneM2M architecture defines the capabilities supported by the oneM2M service layer, which are referred to as Capability Service Functions (CSFs). A set of CSFs defines the service layer, which is referred to as the Common Service Entity (CSE). In accordance with one embodiment contemplated herein, the location management and privacy control functions of the SC described above may be implemented as a oneM2M CSF. This embodiment, in a oneM2M Resource-Oriented Architecture (ROA), is illustrated in FIG. 23. As shown, in this embodiment, the architecture 2300 comprises an Application Entity (AE) that provides application logic for end-to-end M2M solutions, a Common Services Entity (CSE)

which defines the service layer and comprises one or more Common Services Functions (CSFs), and Network Service Entity (NSE). Examples of AEs include fleet tracking applications, remote blood sugar monitoring applications, and remote power metering and controlling applications. The CSE interfaces with the AE via an Mca reference point, with other CSEs via an Mcc reference point, and with the NSE via an Mcn reference point. As further shown, the location management and privacy control functions of the SC described above may be implemented as a Location and Privacy Management CSF in the CSE.

In this embodiment, a device may communicate with the Location and Privacy Management CSF via the Mca reference point to report, update, or delete its location information, as well as to set up its privacy policy, as described above. Other devices may retrieve a device's location via the Mca reference point from the Location and Privacy Management CSF subject to the privacy control. The Location and Privacy Management CSF may obtain a device's location from the underlying NSE via the Mcn reference point. Additionally, other CSEs may talk to the Location and Privacy Management CSF via the Mcc reference point to discover and retrieve a device's location subject to the privacy control.

Figure 24:
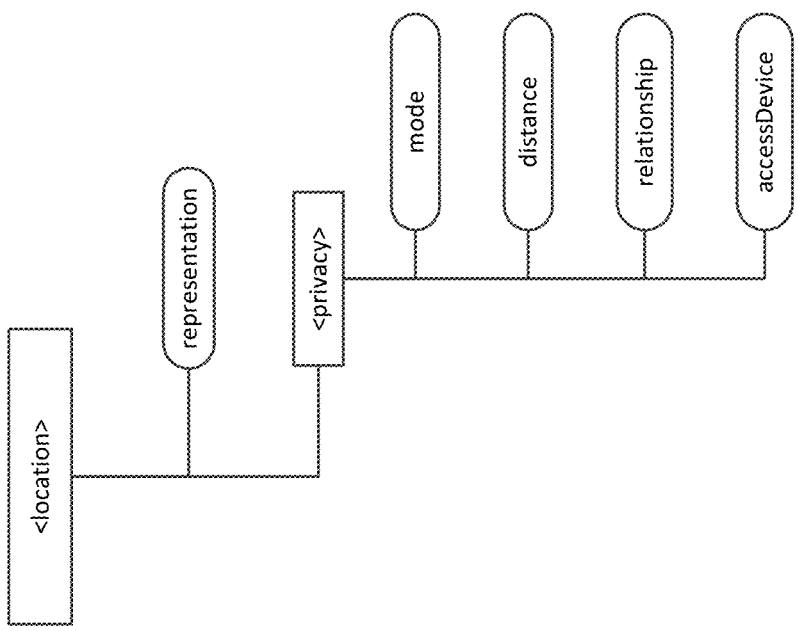
FIG. 24 illustrates an example resource structure for the embodiment of FIG. 23.

FIG. 24 illustrates an exemplary <location> resource structure that may be used by the Location and Privacy Management CSF to store the location and privacy policy information for a device. The representation attribute comprises the actual representation of the device location information, and the set of <privacy> attributes define the privacy policy for the location information. The "mode" attribute stores the privacy mode of the information (e.g., totally public, public with distance, public with relationship, semi-public, or totally private). The "distance" attribute stores a distance value—only devices within the specified distance may access the location information. The "relationships" attribute stores information concerning a relationship—only devices which have the described relationship with the device may access its location information. The "accessDevice" attributes stores a list of devices—for example by their device IDs—which are expressly allowed to access the device location information.

Figure 25:
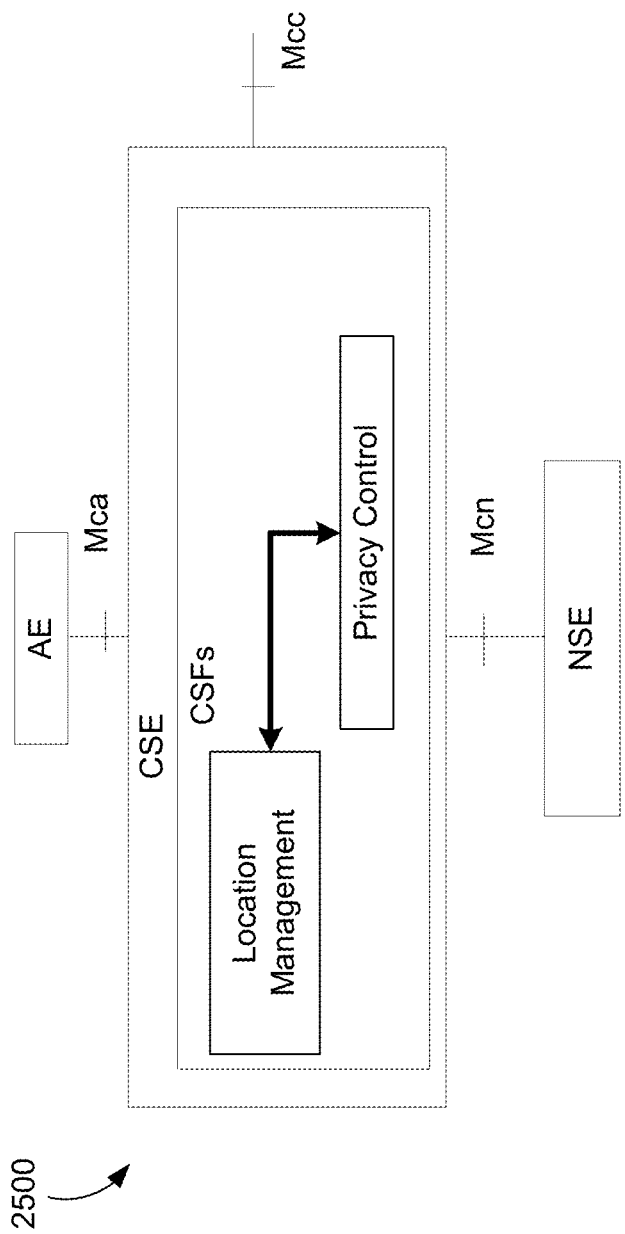
FIG. 25 illustrates another embodiment of location management and privacy control in a one M2M ROA.

FIG. 25 illustrates another embodiment in an exemplary architecture 2500, in which a Location Management CSF and a Privacy Management CSF may be separately hosted in a CSE. The Privacy Management CSF may be in charge of privacy control of location information as well as privacy control of other information or for other applications, such as applications or services hosted by the devices. As a result, the Location Management CSF may interact with the Privacy Management CSF to provide the device location management and privacy control as described herein.

Figure 26:
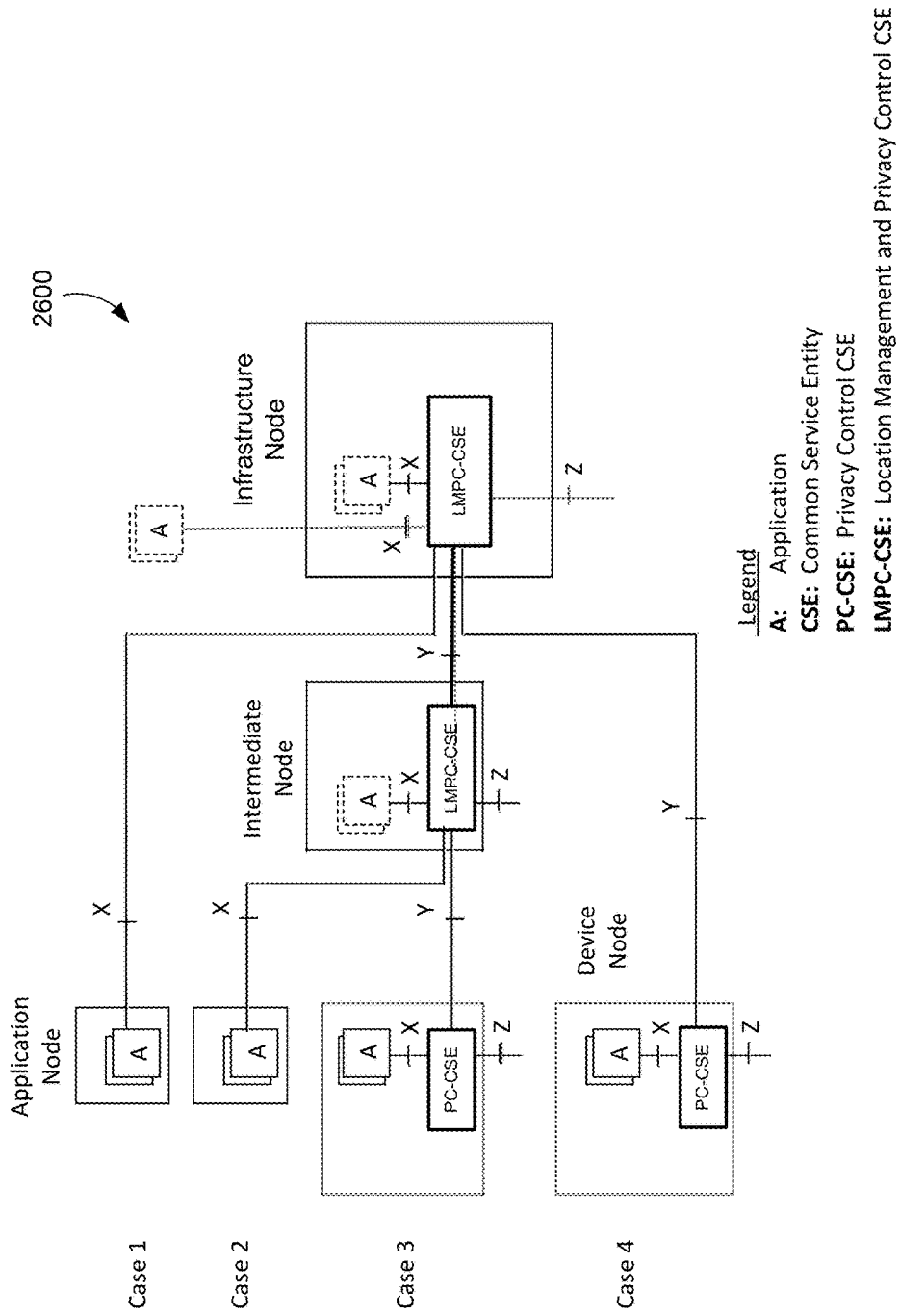
FIG. 26 illustrates an exemplary deployment of a Location Management and Privacy Control CSE in a oneM2M architecture.

FIG. 26 illustrates an exemplary oneM2M architecture deployment 3000, illustrating how a Location Management and Privacy Control CSE may be deployed in an Intermediate Node and an Infrastructure Node according to some embodiments. As shown, an Application Node may host a Privacy Control CSE that interacts with the Location Management and Privacy Control CSE in one of the intermediate or infrastructure nodes to implement the embodiments described herein.

OneM2M Service Oriented Architecture (SOA) Embodiment

Figure 27:
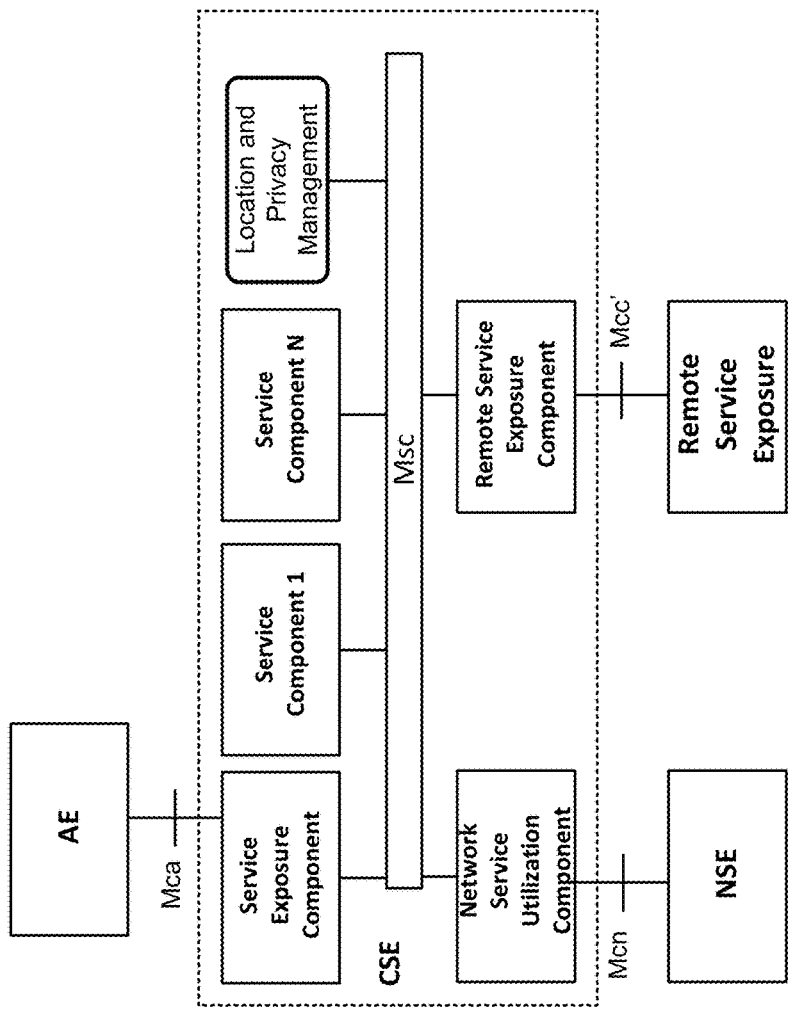
FIG. 27 illustrates an embodiment of location management and privacy control in a oneM2M Service-Oriented Architecture (SOA).

FIG. 27 shows another embodiment of the location management and privacy control processes in the oneM2M architecture. In this embodiment, the processes are implemented in the form of a Location and Privacy Management service component in accordance with the oneM2M Service Component Architecture. In this embodiment, any device may communicate with the Location and Privacy Management service component via the Mca reference point to report, update, or delete its location information, as well as to set up its privacy policy. Other devices may retrieve a device's location via the Mca reference point from the Location and Privacy Management service component subject to its privacy control.

3GPP MTC Architecture Embodiment

Figure 28:
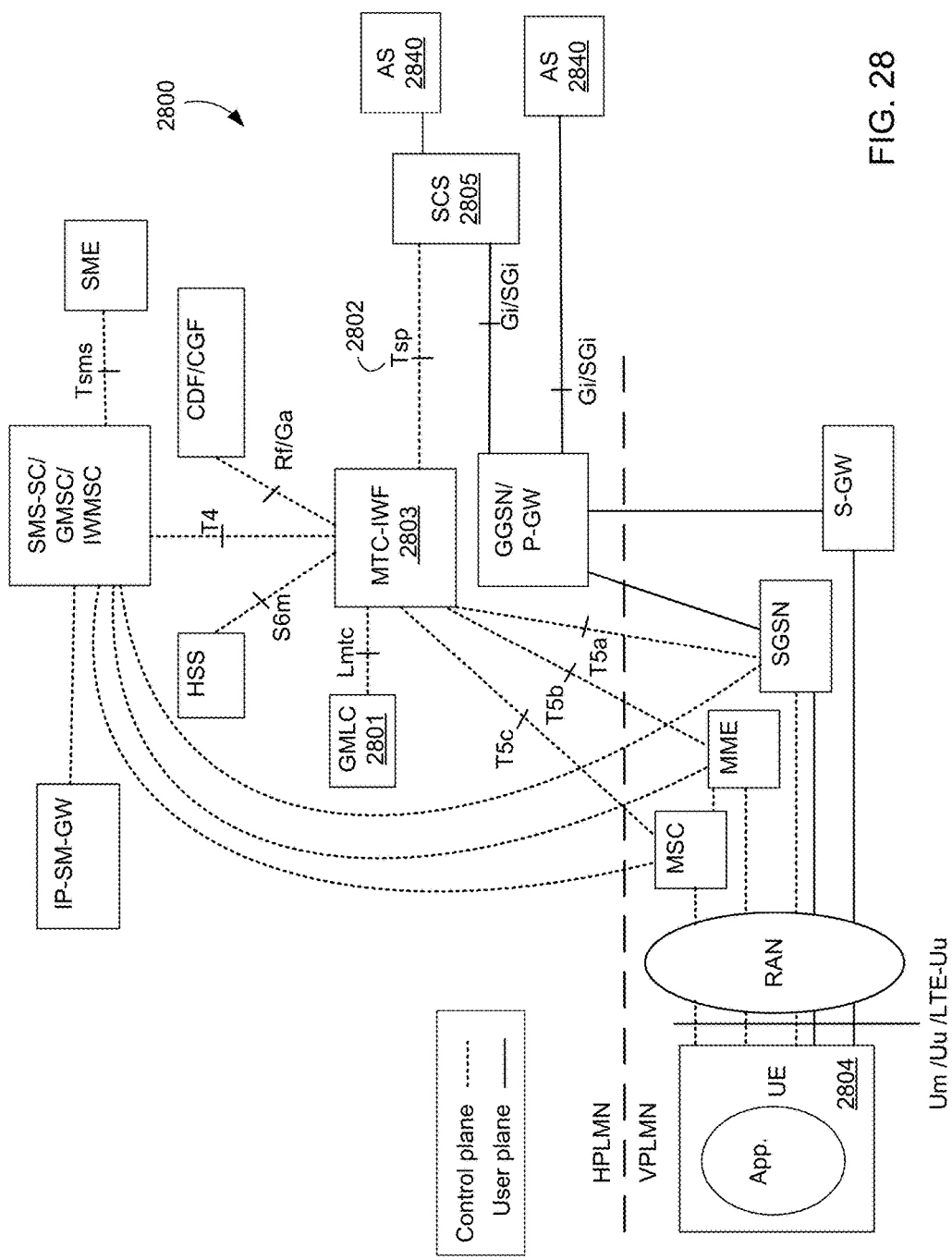
FIG. 28 illustrates an embodiment of location management and privacy control in a 3GPP Machine Type Communication (MTC) architecture.

In the 3GPP MTC architecture, a Service Capability Server (SCS) is analogous to the SC described above. FIG. 28 illustrates another embodiment in which the location management and privacy control processes of the SC described above are implemented in an SCS 2805 of a system 2800 operating in accordance with the 3GPP MTC architecture. In this embodiment the SCS may request the location information of a User Equipment (UE) 2804 (i.e., a device) from a Gateway Mobile Location Center (GMLC) 2801. To support this, according to an embodiment, a new interface between the Machine Type Communication Interworking Function (MTC-IWF) and the GMLC may be used. Such an interface may be referred to as the "Lmtc" reference point as shown in FIG. 27. In such an embodiment, the Tsp reference point 2802 may be mapped to the Le reference point described in the functional description of Location Services (LCS) in 3GPP TS 23.271. The MTC-IWF 2803 may act as the proxy for the SCS to request the location information for UE 2804 from the GMLC 2801 and to forward the location information for UE 2804 from the GMLC 2801 to the SCS 2805.

Device and SC User-Interfaces

As described above in reference to FIG. 3 and FIG. 4, devices utilizing the location management and privacy control features described herein may incorporate human user interface hardware and/or software. The devices and methods described herein thus may optionally include variations in which a user is either informed of activities of, or information about, other devices, initiates action, or both. For example, an end user of a device may use the user interface of the device to enter parameters to establish or alter the privacy policy for location information of the device. This could include entering or altering distance or relationship criteria, for instance. The device would then report the new or revised policy to the SC, using the device location report message of FIG. 6 for example. Similarly, the user could initiate the deletion of his or her device's location from the SC, initiate a request for services, or initiate an advertisement of services. The user may also use the user interface to request location information about other devices. For example, the user may enter distance or relationship criteria, e.g. using some user interface menus displayed on a display, that are then sent to the SC in a device retrieval message having the format of FIG. 5. Location information about other devices sent back to the device by the SC in response to the device retrieval message may then be displayed on the device's user interface.

Similarly, a user of an SC may be a system administrator who may wish to review and report on the privacy policies reported to the SC. The user interface of the SC may be constructed such that such an administrator could see all of the data. Alternatively, the administrator may be able to see all the data for those devices reporting that their location information is "public." Alternatively, the SC could be arranged to let the administrator see only generalized or anonymized data.

It is understood that any or all of the systems, methods, and processes described herein may be embodied in the form of computer executable instructions (i.e., program code) stored on a computer-readable storage medium. Such instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals. Computer readable storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other physical medium that can be used to store the desired information and that can be accessed by a computer.

In describing preferred embodiments of the subject matter of the present disclosure, as illustrated in the figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A server implementing a Machine-to-Machine (M2M) service layer in a communication network, the server comprising a computer memory containing instructions and a computer processor which executes the instructions, wherein the instructions are implemented as a function of a first service capability in the M2M service layer, wherein the first service capability is capable of applying to M2M terminal devices, M2M gateway devices, and M2M applications, and wherein the server is arranged:
to receive, from a first device via the communication network, location information and a privacy policy of the first device, wherein the privacy policy comprises at least one of a criteria relating to an identity of a second device, a distance, and a relationship among two or more devices;
to apply the privacy policy to information known to the server regarding a set of devices, the set of devices comprising the first device and the second device;
to choose from the set of devices those devices that meet criteria of the privacy policy; and
to push to the chosen devices via the communication network the location information of the first device,
wherein the location information is configured to be utilized by a second service capability, the second service capability being applied in the first device so that the second service capability enables the M2M applications to interact with the M2M terminal devices or the M2M gateway devices and to perform one or more service layer functions comprising at least one of data collection, data analysis, device management, security, billing, service discovery, and device discovery.

2. The server of claim 1, wherein the function of the first service capability is defined by a oneM2M standard and the server is capable of operating according to the oneM2M standard.

3. The server of claim 1, wherein the server is further arranged:
to detect a new location information regarding the first device;
to reapply the privacy policy;
to push a notification that the location information of the first device is no longer valid to any previously chosen devices that no longer meet the criteria of the privacy policy; and
to push the new location information of the first device to any devices that currently meet the criteria of the privacy policy in view of the new location information.

4. The server of claim 1, wherein the server is further arranged:
to receive a request from the second device for location information of the first device; and,
if receipt of the location information by the second device is in accordance with the privacy policy, to respond to the second device by providing the location information of the first device.

5. The server of claim 1, wherein the server is further arranged:
to receive a request from the first device to provide a list of other devices known to the server to meet the criteria of the privacy policy of the first device;
to receive a separate privacy policy and separate location information from each of the other devices; and
to provide the separate location information of each of those other devices that accord with the privacy policy of the first device, where provision of such information to the first device is also consistent with the separate privacy policy of each other devices.

6. The server of claim 1, wherein the server is further arranged:
to receive a request from a second terminal for the location of a device providing a desired service layer function; and,
if receipt of the location information by the second device is in accordance with the privacy policy of the first device, to respond to the second device by providing the location information of the first device.

7. The server of claim 1, wherein the server is further arranged:
to receive a request from the second device for a desired service layer function to be provided; and
if provision of the service layer function to the second device is in accordance with the privacy policy of the first device, to request the desired service layer function from the first device, to receive an output of the desired service layer function from the first device, and to provide the output to the second device.

8. The server of claim 1, wherein the server is further arranged:
- to receive, from the first device, information regarding the one or more service layer functions performed by the first device;
- to publish, to the chosen devices via the communication network, the information regarding the one or more service layer functions performed by the first device.

9. The server of claim 1, wherein the server is further arranged:
- to receive, from the first device, information regarding the one or more service layer functions performed by the first device and a service advertising rule;
- to select, from the set of devices those devices that meet criteria of the service advertising rule;
- to publish, to the selected devices via the communication network, the information regarding the one or more service layer functions performed by the first device.

10. The server of claim 9, wherein the server is further arranged:
- to publish, to the selected devices via the communication network, the service advertising rule.

11. The server of claim 1, wherein the privacy policy comprises a rule that the location information of the first device be treated by the service layer as either totally public, public only to other devices within a specified distance, public only to devices identified by the device, or totally private.

12. A first device, comprising a computer memory containing instructions and a computer processor which executes the instructions, wherein the instructions are implemented as a function of a first service capability in a machine-to-machine (M2M) service layer, the first service capability being capable to perform one or more service layer functions comprising data collection, data analysis, device management, security, billing, service discovery, or device discovery, wherein the first device is arranged to:
- to send, to an M2M server via a communication network, location information and a privacy policy of the first device, wherein the privacy policy comprises one or more of a criteria relating to an identity of a second device, a distance, and a relationship among two or more devices;
- to receive, from a third device, a request for a service layer function, wherein the third device is selected by the M2M server in accordance with the privacy policy; and
- to provide the requested service layer function using the first service capability in accordance with the request for the service layer function.

13. The first device of claim 12, wherein the function of the first service capability is defined by a oneM2M standard and the first device is capable of operating according to the oneM2M standard.

14. The first device of claim 12, wherein the privacy policy comprises a rule that the location information of the first device be treated by the service layer as either totally public, public only to other devices within a specified distance, public only to devices identified by the device, or totally private.

15. The first device of claim 12, wherein the privacy policy comprises a rule permitting the server to honor a request from the second device for location information of the first device, provided that receipt of the location information by the second device is in accordance with the privacy policy.

16. The first device of claim 12, wherein the first device is further arranged:
- to send, to the server, a request for a list of devices known to the server to meet the criteria of the privacy policy; and
- to receive separate location information of each of those other devices.

17. The first device of claim 12, wherein the first device is further arranged:
- to receive, from the server, a request for provision of a desired service layer function for the second device; and
- to provide, to the server, and output of the desired service layer function.

18. The first device of claim 12, wherein the first device is further arranged to publish, to the server, information regarding the one or more service layer functions performed by the first device.

19. The first device of claim 12, wherein the first device is further arranged to send, to the server, information regarding the one or more service layer functions performed by the first device and a service advertising rule, the service advertising rule pertaining to which devices the server may send the information regarding the one or more service layer functions performed by the first device.

20. The first device of claim 19, wherein the service advertising rule further pertains to which devices a device receiving the information from the server may forward the information.

* * * * *